United States Patent
Fuchs

(10) Patent No.: US 11,238,229 B2
(45) Date of Patent: *Feb. 1, 2022

(54) SYSTEM AND METHOD FOR USE OF SEMANTIC UNDERSTANDING IN STORAGE, SEARCHING AND PROVIDING OF DATA OR OTHER CONTENT INFORMATION

(71) Applicant: Gil Emanuel Fuchs, Nes Tziona (IL)

(72) Inventor: Gil Emanuel Fuchs, Nes Tziona (IL)

( * ) Notice: Subject to any disclaimer, the term of this patent is extended or adjusted under 35 U.S.C. 154(b) by 350 days.

This patent is subject to a terminal disclaimer.

(21) Appl. No.: 16/132,777

(22) Filed: Sep. 17, 2018

(65) Prior Publication Data

US 2019/0087413 A1    Mar. 21, 2019

Related U.S. Application Data

(63) Continuation of application No. 14/510,366, filed on Oct. 9, 2014, now Pat. No. 10,078,633, which is a continuation of application No. 12/905,314, filed on Oct. 15, 2010, now Pat. No. 8,880,537.

(Continued)

(51) Int. Cl.
*G06F 40/30* (2020.01)
*G06N 5/02* (2006.01)
(Continued)

(52) U.S. Cl.
CPC ............ *G06F 40/30* (2020.01); *G06F 16/13* (2019.01); *G06F 16/24* (2019.01); *G06F 16/36* (2019.01);
(Continued)

(58) Field of Classification Search
CPC ........ G06F 40/30; G06F 40/40; G06F 40/205; G06F 40/211; G06F 40/268; G06F 16/13;
(Continued)

(56) References Cited

U.S. PATENT DOCUMENTS 5,873,056 A    2/1999  Liddy
5,963,940 A   10/1999  Liddy
(Continued)

OTHER PUBLICATIONS

Gi-Chul Yang, Young Bae Choi, and Jonathan C. Oh, CGMA: A Novel Conceptual Graph Matching Algorithm, Conceptual Structures: Theory and Implementation Lecture Notes in Computer Science, vol. 754, published 1993, pp. 252-261.
(Continued)

*Primary Examiner* — Albert M Phillips, III
(74) *Attorney, Agent, or Firm* — Downs Rachlin Martin PLLC

(57) ABSTRACT

A system and method for using semantic understanding in storing and searching data and other information. A linearized tuple-based version of a conceptual graph can be created from a user input. A plurality of conceptual graphs, or portions thereof, can be compared to determine matches. An associative database can be created and/or searched using a hierarchy of conceptual graphs in tuple format, so that the data storage and searching of such database is optimized. The associative database can be used to integrate data from multiple different sources; form part of an Internet or other search engine; or used in other implementations. Also disclosed herein is a system and method for use of semantic understanding in searching and providing of content is described herein. In accordance with an embodiment, the system comprises a Syntactic Parser (SP) or statistical word tokenizer for data retrieval and parsing; a Syntax To Semantics (STS) transformational algebra-based semantic rule set, and an Associative Database (ADB) of linearized tuple conceptual graphs (TCG), utilizing a conceptual graph formalism. Data can be represented within the ADB, enabling both fast data retrieval in the form of semantic objects and a broad ranging taxonomy of content.

6 Claims, 20 Drawing Sheets

Related U.S. Application Data

(60) Provisional application No. 61/378,819, filed on Aug. 31, 2010, provisional application No. 61/253,039, filed on Oct. 19, 2009.

(51) Int. Cl.

| | |
|---|---|
| *G06F 16/13* | (2019.01) |
| *G06F 16/24* | (2019.01) |
| *G06F 16/36* | (2019.01) |
| *G06F 40/40* | (2020.01) |
| *G06F 40/205* | (2020.01) |
| *G06F 40/211* | (2020.01) |
| *G06F 40/268* | (2020.01) |
| *G06Q 30/02* | (2012.01) |

(52) U.S. Cl.
CPC .......... *G06F 16/367* (2019.01); *G06F 40/205* (2020.01); *G06F 40/211* (2020.01); *G06F 40/268* (2020.01); *G06F 40/40* (2020.01); *G06N 5/02* (2013.01); *G06Q 30/0241* (2013.01)

(58) Field of Classification Search
CPC ........ G06F 16/24; G06F 16/36; G06F 16/367; G06Q 30/0241; G06Q 5/02
See application file for complete search history.

(56) References Cited

U.S. PATENT DOCUMENTS

| | | |
|---|---|---|
| 6,006,221 A | 12/1999 | Liddy |
| 6,026,388 A | 2/2000 | Liddy |
| 6,038,561 A | 3/2000 | Snyder |
| 6,041,331 A | 3/2000 | Weiner |
| 6,076,088 A | 6/2000 | Paik |
| 6,094,650 A | 7/2000 | Stoffel |
| 6,263,335 B1 | 7/2001 | Paik |
| 6,269,368 B1 | 7/2001 | Diamond |
| 6,275,229 B1 | 8/2001 | Weiner |
| 6,289,338 B1 | 9/2001 | Stoffel |
| 6,304,864 B1 | 10/2001 | Liddy |
| 6,751,621 B1 | 6/2004 | Calistri-Yeh |
| 6,829,613 B1 | 12/2004 | Liddy |
| 6,847,979 B2 | 1/2005 | Allemang |
| 7,107,524 B2 | 9/2006 | Lin |
| 7,299,247 B2 | 11/2007 | Calistri-Yeh |
| 7,406,456 B2 | 7/2008 | Calistri-Yeh |
| 7,444,356 B2 | 10/2008 | Calistri-Yeh |
| 7,890,518 B2 | 2/2011 | Aasman |
| 7,912,868 B2 | 3/2011 | Calistri-Yeh |
| 7,966,291 B1 | 6/2011 | Petrovic et al. |
| 8,463,808 B2 | 6/2013 | Peoples |
| 9,110,985 B2 | 8/2015 | Boscolo |
| 2004/0093328 A1 | 5/2004 | Damle |
| 2005/0216516 A1 | 9/2005 | Calistri-Yeh |
| 2006/0155743 A1 | 7/2006 | Bohannon |
| 2008/0016020 A1 | 1/2008 | Estes |
| 2009/0077113 A1 | 3/2009 | Fidaali et al. |

OTHER PUBLICATIONS

Fuchs, "Practical natural language processing question answering using graphs", PhD thesis, University of California, Santa Cruz, Dec. 2004, 164 pages.

International Search Report for PCT/US2010/053063 dated Jan. 27, 2011.

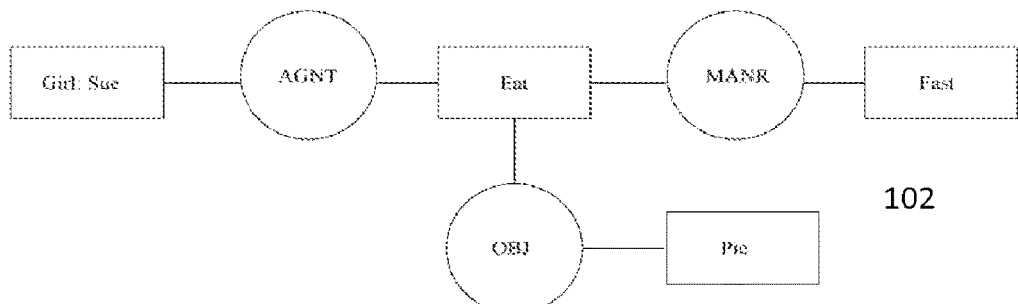
FIG. 2
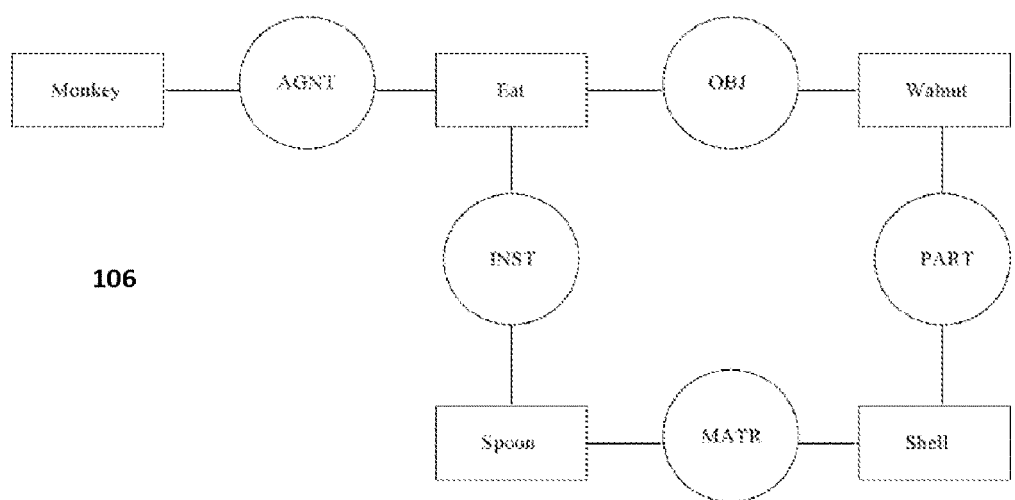
FIG. 3
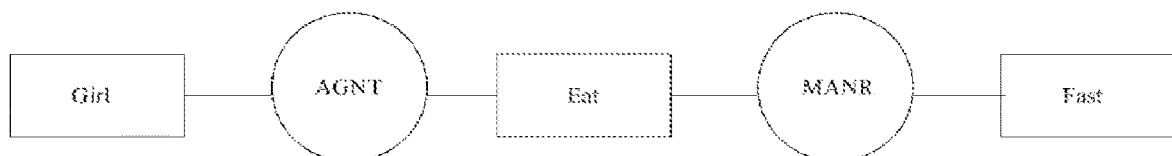
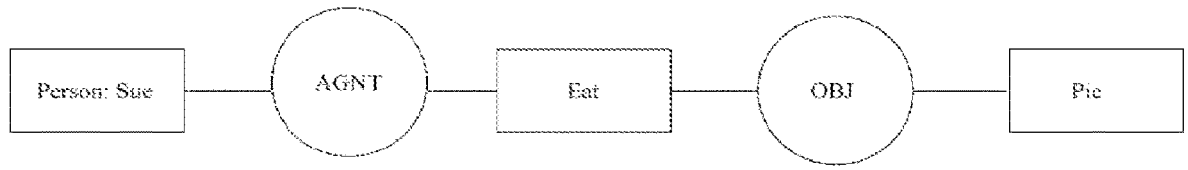
FIG. 4

Conceptual Relation Types 120

- ACCM Accompaniment: *entity* X accompanies *entity* Y.

- AGNT Agent: *animate* is the actor of *act*.

- ARG Argument: links *function* to *data*.

- ATTR Attribute: *entity* X has attribute *entity* Y.

- CAUS Cause: *state* X causes *state* Y.

- CHRC Characteristic: *entity* X has characteristic *entity* Y.

- CHLD Child: *person* Y is the child of *person* X.

- CONT Content: *entity* X has content *entity* Y.

- DUR Duration: links a *state* to a *time-period*.

- EXPR Experiencer: links a *state* to an *experiencer* who is experiencing the state.

- FREQ Frequency: links an *event* to a set of *time*.

- INIT Initiator: links an *act* to an *animate* who initiated the act.

- INST Instrument: links an *entity* to an *act* in which the entity is causally involved.

- LINK Link: links *anything* to *anything* (a bootstrapping relation).

- LOC Location: links *anything* to a *place*.

- MANR Manner: links an *act* to an *attribute*.

- MATR Material: links an *entity* to a *substance*.

- MEAS Measure: links a *dimension* to a *measure*.

- METH Method: links an *act* to a *situation* that shows how the act is accomplished.

FIG. 7A

Conceptual Relation Types 120

- NAME Name: links an *entity* to a *word*.

- NECS Necessary: a monadic relation that asserts the truth of a *proposition*.

- NEG Negation: a monadic relation that asserts the falsehood of a *proposition*.

- OBJ Object: links an *act* to an *entity*.

- PART Part: *entity* Y is a part of *entity* X.

- PAST Past: a monadic relation that asserts the truth of a *proposition* at some point in time which is before the present time.

- PATH Path: links an *act* to a set of *places*.

- PTIM Point-in-time: links *anything* to a *time* in which it occurred.

- POSS Possession: links an *animate* to an *entity*.

- PSBL Possible: a monadic relation that asserts the possible truth of a *proposition*.

- QTY Quantity: links a set of *entities* to a *number*.

- RCPT Recipient: links an *act* to an *animate*.

- RSLT Result: links an *act* to an *animate* that is generated by the act.

- SRCE Source: links an *act* to an *animate* from which it originates.

- SUPP Support: *entity* X supports *entity* Y.

- SUCC Successor: a *thing* succeeds *another*.

- UNTL Until: links a *state* to a *time* at which the state ceases to exist.

FIG. 7B

Link Grammar Connection/Linkage Elements 142

- A Connects prenominal adjectives to nouns.
- AN Connects noun-modifiers to nouns.
- B Used in a number of situations involving relative clauses and questions.
- C Connects nouns to relative clauses.
- CL Connects conjunctions and certain verbs with subjects of clauses.
- CM Connects conjunctions and certain verbs with subjects of clauses.
- CO Used to connect *openers* to subjects of clauses.
- D Connects determiners to nouns.
- EV Connects verbs and adjectives to modifying phrases such as adverbs, prepositional phrases or *words*, certain conjunctions, and other items.
- EX Used for adverbs modifying verbs which precede the verb.
- G Connects proper nouns together in a series.
- GI Connects verbs that take present participles with present participles.
- I Connects certain verbs with infinitives.
- ID Idioms.
- J Connects prepositions to their objects.
- K Connects certain verbs with participles such as *in, out, up,* and the like.
- M Connects nouns to various kinds of post-nominal modifiers, such as prepositional phrases, collapsed relatives and possessive relatives.

FIG. 11A

Link Grammar Connection/Linkage Elements 142

- O Connects transitive verbs to direct or indirect objects. Note that the 'O' comes in several varieties: Os (for singular), Op (for plural), O*t (following the 's' or 'p' a 't' is an indication that the verb - that is, the word to the left of the connector - is a form of the verb 'to be').

- P Used to link forms of the verb "be" to various words that can be its complements: prepositions, adjectives, and passive and progressive participles.

- Q Used in questions.

- R Connects certain verbs and adjectives to question-words, forming indirect questions.

- S Connects subject-nouns to finite verbs.

- SI Used in subject verb inversion.

- SXI Connects non-referential subjects *it* and *there* to invertible verbs in questions with subject-verb inversion.

- T Connects forms of *have* with past participles.

- TH Connects words that take *that clause* complements with the word *that*.

- TT Connects certain verbs to infinitival complements, when the verb also takes a direct object. The word *that*.

- TO Connects verbs and adjectives which take infinitival complements to the word *to*.

- Q Connects auxiliaries in simple subject verb inversion questions when there is no preceding object.

- V Used to connect passive participles to forms of *be*.

FIG. 11B $$\langle\text{some-LINK}\rangle.L$$

$$\langle\text{some-LINK}\rangle.R$$

where $\langle\text{some-LINK}\rangle \in \{\text{the set of all links}\}$ $.L$ is left word of this link $.R$ is right word of this link $$\langle\text{some-WORD}\rangle_{\Delta_L}\langle\text{some-LINK}\rangle$$

$$\langle\text{some-WORD}\rangle_{\Delta_R}\langle\text{some-LINK}\rangle$$

where $\langle\text{some-WORD}\rangle \in \{\text{the set of all words in the linkage}\}$ $\langle\text{some-LINK}\rangle \in \{\text{the set of all links}\}$ $\Delta_L$ is follow one of the links on the left $\Delta_R$ is follow one of the links on the right

SYSTEM AND METHOD FOR USE OF SEMANTIC UNDERSTANDING IN STORAGE, SEARCHING AND PROVIDING OF DATA OR OTHER CONTENT INFORMATION

CLAIM OF PRIORITY

This application is a continuation of U.S. patent application Ser. No. 14/510,366, filed on Oct. 9, 2014, entitled "SYSTEM AND METHOD FOR USE OF SEMANTIC UNDERSTANDING IN STORAGE, SEARCHING AND PROVIDING OF DATA OR OTHER CONTENT INFORMATION"; which application was a continuation of U.S. patent application Ser. No. 12/905,314, filed on Oct. 15, 2010, (now U.S. Pat. No. 8,880,537) entitled "SYSTEM AND METHOD FOR USE OF SEMANTIC UNDERSTANDING IN STORAGE, SEARCHING AND PROVIDING OF DATA OR OTHER CONTENT INFORMATION". Each of these applications claim the benefit of priority to U.S. Provisional Application No. 61/378,819, filed Aug. 31, 2010, entitled "SYSTEM AND METHOD FOR USE OF SEMANTIC UNDERSTANDING IN SEARCHING AND PROVIDING OF CONTENT"; and U.S. Provisional Patent Application No. 61/253,039, filed on Oct. 19, 2009, entitled "SYSTEM AND METHOD FOR STORAGE AND SEARCHING OF DATA AND OTHER INFORMATION." Each of these applications is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

FIELD OF THE INVENTION

Embodiments of the invention are generally related to data storage and data search techniques, and are particularly related to systems and methods for using semantic understanding and conceptual graph techniques in storage, searching, retrieving and providing of data or other content or information.

BACKGROUND

Several techniques have been investigated over the years with the goal of helping promote human-computer interactions, particularly to allow users to have more human-like interactions with computers. In the context of verbal or written interaction, one approach is to enable the computer to understand phrases provided in a natural language format as uttered or typed by humans. An important factor in computer understanding then is to ensure the computer can, to a reasonable extent, understand what is being said by the user.

Various attempts at addressing this problem have been considered. For example, conceptual graphs have been employed to capture the meaning and content of a human utterance. Additional information describing various aspects and examples of conceptual graphs, link grammars, and associative databases are described in "PRACTICAL NATURAL LANGUAGE PROCESSING QUESTION ANSWERING USING GRAPHS", PhD dissertation by Gil Emanuel Fuchs, University of California Santa Cruz, December 2004, which is herein incorporated by reference. However, while conceptual graphs can be powerful constructs for capturing the meaning of language, such graphs must typically be created from natural language using some form of artificial intelligence and/or manual input by a skilled operator. This has generally limited the usage of conceptual graphs in commercial application environments.

As the amount of data stored and accessed by users increases considerably every day, techniques are desired that allow for efficient storage and searching of such data, in a manner that allows for ease of use by the user, and also provides for additional industrial uses. These are some of the areas that embodiments of the present invention are intended to address.

BRIEF SUMMARY OF THE INVENTION

Disclosed herein is a system and method for using semantic understanding in storing and searching data and other information. In accordance with an embodiment, techniques are provided to allow capturing and interpreting semantics or meaning from a user input. A linearized tuple-based version of a conceptual graph can be created from the user input. A plurality of conceptual graphs, or portions thereof, can be compared to determine matches. An associative database can be generated and/or searched using a hierarchy of conceptual graphs in tuple format, so that the data storage and searching of such database is optimized. The associative database can be used to integrate data from multiple different sources; form part of an Internet or other search engine; or used in other implementations. In accordance with an embodiment, integration can be performed in an offline manner, to gather information or data in a centralized location and to generate new semantic connections between the information or data; and in an online manner in which the system uses semantic rendering to provide real-time responses to input data; or to assess degree of closeness of relevance between two sets of text. Embodiments of the invention are particularly suited to efficiently storing and searching vast amounts of textual data.

Also disclosed herein is a system and method for use of semantic understanding in searching and providing of content. In accordance with an embodiment, the system comprises a Syntactic Parser (SP) or statistical word tokenizer for data retrieval and parsing; a Syntax To Semantics (STS) transformational algebra-based semantic rule set, and an Associative Database (ADB) of linearized tuple conceptual graphs (TCG), utilizing a conceptual graph formalism. Data can be represented within the ADB, enabling both fast data retrieval in the form of semantic objects and a broad ranging taxonomy of content, e.g. advertising categories. Each semantic object contains all the related terms and phrases articulating a specific subject, enabling automatic categorization of any given page. This semantic approach can be used in a variety of ways, for example to improve the ability to serve ads based on the meaning of a website's page content. By semantically analyzing the web pages, the system can properly understand and classify the meaning and sentiment of any given digital text, and accordingly ensure that the web page receives the most appropriate advertising. The system can also ensure that campaigns are placed on pages which are contextually relevant to them, whatever the format and medium. For example, the semantic approach can be used to analyze an advertiser's ad and the website it links to, in order to identify the most relevant matches.

BRIEF DESCRIPTION OF THE FIGURES

FIGS. 2-6 show various illustrations of conceptual graphs.

FIGS. 7A-B show examples of conceptual relation types which can be used in accordance with various embodiments.

FIGS. 11A-B show examples of link grammar connection/linkage elements which can be used in accordance with various embodiments.

FIG. 12 illustrates an algebra for the use of semantic rules, in accordance with an embodiment.

FIG. 13 illustrates examples of semantic rules which can be used in accordance with an embodiment.

DETAILED DESCRIPTION

Figure 1:
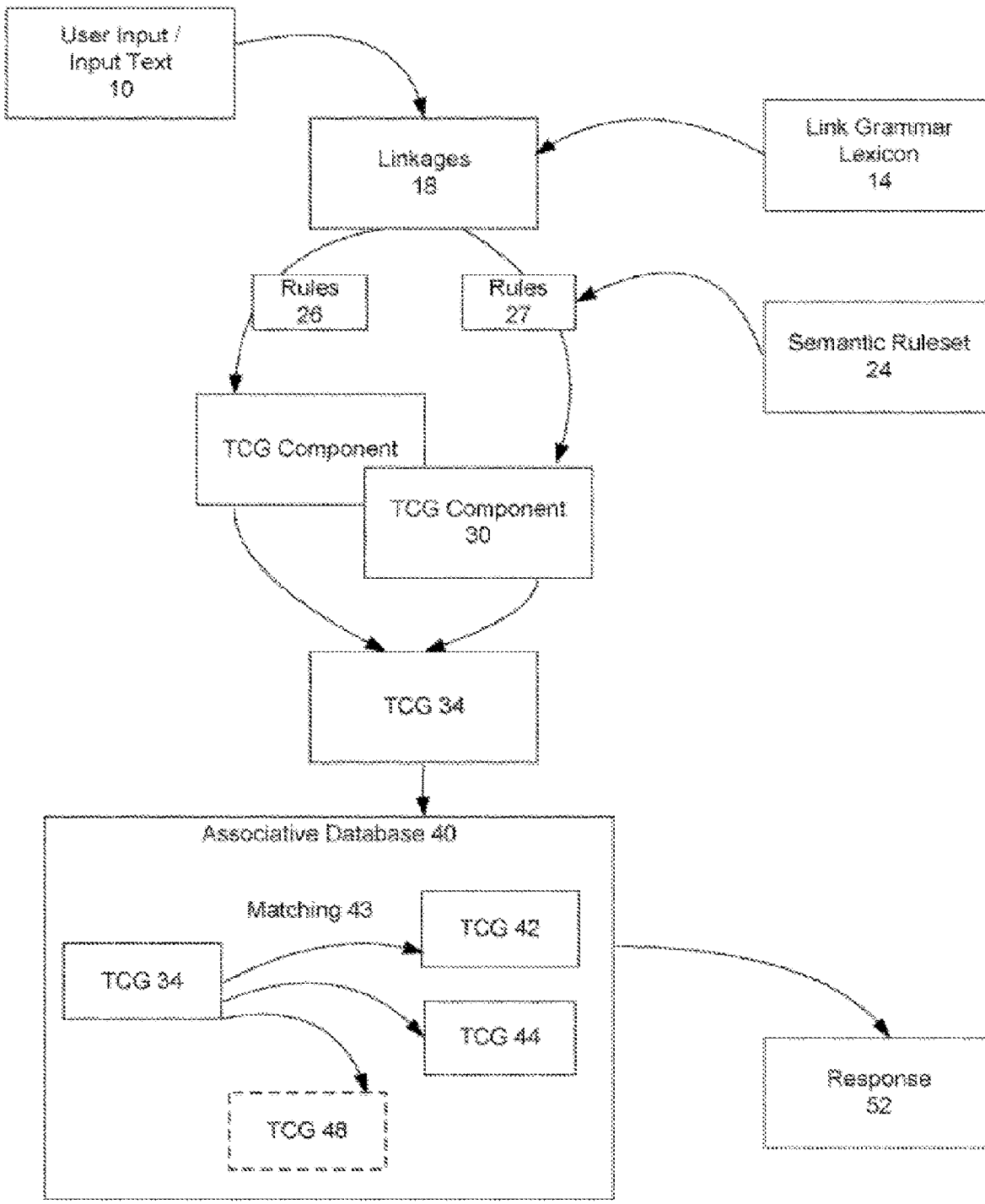
FIG. 1 shows an illustration of system, together with various phases of data storage and/or searching in accordance with an embodiment.

As described above, techniques have been investigated over the years with the goal of helping promote human-computer interactions, particularly to allow users to have more human-like interactions with computers. In the context of verbal or written interaction, one approach is to enable the computer to understand phrases provided in a natural language format as uttered or typed by humans. An important factor in computer understanding then is to ensure the computer can, to a reasonable extent, understand what is being said by the user. As the amount of data stored and accessed by users increases considerably every day, techniques are desired that allow for efficient storage and searching of such data, in a manner that allows for ease of use by the user, and also provides for additional industrial uses.

In accordance with an embodiment, a system and method for use of semantic understanding in searching and providing of content is described herein. In accordance with an embodiment, the system comprises a Syntactic Parser (SP) or statistical word tokenizer for data retrieval and parsing; a Syntax To Semantics (STS) transformational algebra-based semantic rule set, and an Associative Database (ADB) of linearized tuple conceptual graphs (TCG), utilizing a conceptual graph formalism. Data can be represented within the ADB, enabling both fast data retrieval in the form of semantic objects and a broad ranging taxonomy of content, e.g. advertising categories. Each semantic object contains all the related terms and phrases articulating a specific subject, enabling automatic categorization of any given page. This semantic approach can be used in a variety of ways, for example to improve the ability to serve ads based on the meaning of a website's page content. By semantically analyzing the web pages, the system can properly understand and classify the meaning and sentiment of any given digital text, and accordingly ensure that the web page receives the most appropriate advertising. The system can also ensure that campaigns are placed on pages which are contextually relevant to them, whatever the format and medium. For example, the semantic approach can be used to analyze an advertiser's ad and the website it links to, in order to identify the most relevant matches.

Techniques are provided to allow capturing and interpreting semantics or meaning from a user input. A linearized tuple-based version of a conceptual graph can be generated from the user input. A plurality of conceptual graphs, or portions thereof, can be compared to determine matches. An associative database can be generated and/or searched using a hierarchy of conceptual graphs in tuple format, so that the data storage and searching of such database is optimized. The associative database can be used to integrate data from multiple different sources; form part of an Internet or other search engine; or used in other implementations. In accordance with an embodiment, integration can be performed in an offline manner, to gather information or data in a centralized location and to generate new semantic connections between the information or data; and in an online manner in which the system uses semantic rendering to provide real-time responses to input data; or to assess degree of closeness of relevance between two sets of text. Embodiments of the invention are particularly suited to efficiently storing and searching vast amounts of textual data. In accordance with an embodiment, the system includes one or more components or processes, including:

Transformation of an input text into a semantic rendering, such as a conceptual graph (CG) rendering, or in accordance with an embodiment a tuple conceptual graph (TCG).

Optimal storage of such conceptual graph or TCG rendering in a manner that is computationally efficient, for example in accordance with an embodiment as a linearized set of TCG tuples.

Tools for comparing, either partially and/or fully, the semantic renderings expressed by the conceptual graphs or TCGs, to determine partial and/or complete matches respectively between two TCGs, as a precursor to matching two semantic renderings, or creating new semantic relationships.

Storing of the semantic renderings, for example as a hierarchical plurality of TCGs, within an associative database, so that the information in the associative database allows for easy searching of TCGs, minimizing the storage needs, while at the simultaneously maximizing the degree to which relationships can be expressed, and the functionality of the data therein.

Use of an associative database, including a hierarchy of TCG therein, to create new semantic renderings, which may not exist in any particular input text or input source, but which themselves provide value, such as information providing, and advertising that is semantically related to the input text. These new renderings can be obtained either by joining complementary disparate bits of info (combinational) or by deductive agglomeration of data, driven by outside rules, i.e. those stored separate from the actual running code of the program.

FIG. 1 shows an illustration of system, together with various phases of data storage and/or searching in accordance with an embodiment. As shown in FIG. 1, the system is configured to receive a user input 10. Such input can be in a natural language or written text format, as expressed by the user in the form of a statement, or a question. In accordance with an embodiment, the system can provide interfaces for receiving such input and/or communicating output to other systems. A parser or statistical word tokenizer together with a link grammar lexicon 14, is used to derive linkages 18 within the user input. An algebraic transformer together with a semantic rule set 24, is then used to transform, per semantic rules 26, 27 each linkage to one or more TCG components 30, such as a TCG relationship with optional variables. Each semantic rule can output one or more TCG relationships or components. All of the TCG components for the input text are then collected and optionally sorted to form a tuple based conceptual graph (TCG) 34. The TCG can be compared with other TCG 42, 44 in a semantic network and/or associative database 40, using full or partial matching techniques 43. TCGs can also be joined to create new TCGs 48 for which information may not have previously been provided by any input source. Depending on the particular implementation (i.e. whether the data input is being added to the database, or searched within the database) the TCG can be stored within the database at an appropriate location, or used to find appropriate data matches within the database, or to provide a result to the user, for example in a natural language or written text format 52.

Introduction to Conceptual Graphs

As described above, in accordance with an embodiment, a tuple based conceptual graph (TCG) can be generated corresponding to a textual input. To better describe the use of TCG, a brief introduction to the use of conceptual graphs (CG) is provided herein.

A CG is useful in pictorially capturing the meaning of a language. Generally speaking, a CG can be considered a connected bipartite graph in which the two kinds of nodes of the bipartite graph are concepts, and conceptual relations. Every conceptual relation has one or more arcs, each of which must be linked to some concept. If a relation has n arcs, it is said to be n-adic, and its arcs are labeled 1, 2, ... n. A single concept by itself may form a CG, but every arc of every conceptual relation must be linked to some concept or another CG in the TCG rendering methodology.

FIG. 2 shows a CG 102 of a typical sentence. As shown in FIG. 2, concept nodes are bounded in boxes, while conceptual relations are circumscribed by circles. Concept nodes are linguistic entities such as, [a girl], [the act of eating], [a pie], [the concept of fastness]. Conceptual relations relate one or more concepts. Examples of conceptual relations are: (the agent relation), (the manner relation), and (the object relation). Although the arcs are typically directed from one concept node to another, for ease of illustration they are not shown as such in this figure, which merely show which concept nodes are connected to which conceptual relations. From this example, the relations can be read as follows: The agent of the action eating is the girl Sue. The manner of the action eating is fast. The object of the action eating is a pie. (Note that "object" here is not used as in linguistic grammatical standard term, but rather as a semantic relation—just like "agent"). The concept node [Eat] has three arcs coming out of it, which shows that this concept node participates in three distinct conceptual relations.

FIG. 3 shows another example of a CG 106, which reads: A monkey is eating a walnut with a spoon made out of the walnut's shell. Besides its pictorial representation, a CG can also be described in a Sowa linear form. To accomplish this, some concept node must be picked as the head of the Sowa linear expression. Usually, the concept node with the most arcs linked to it makes the best choice for the head. This produces the simplest CG. Picking [EAT] in the above example for the head yields the following Sowa linear form.

```
[EAT] -
    (AGNT) --> [MONKEY]
    (OBJ) --> [WALNUT : *x]
    (INST) --> [SPOON] --> (MATR) --> [SHELL] <- (PART) <-
    [WALNUT : *x]
```

As used above, the symbol x is used as a variable to denote an unspecified individual of type [WALNUT]. Both instances must be the same; hence, in this instance x is a binding variable. An alternative tuple-based notation can be used, in which the binding variable is not necessary. In accordance with this convention, a rose is a rose is a rose. All occurrences of a concept node are considered the same, unless differentiated. In accordance with an embodiment, one walnut is first differentiated from another with a number designator, which leads to:

```
[EAT] -
    (AGNT) --> [MONKEY]
    (OBJ) --> [WALNUT.1]
    (INST) --> [SPOON] --> (MATR) --> [SHELL] <-- (PART) <--
    [WALNUT.2]
```

The above Sowa linear CG can be read as: A monkey is eating a walnut, with a spoon made from a shell of another walnut. Alternatively, instead of the concept node [EAT] and concept node [SPOON] could be used the head, which would produce the following notation:

```
[SPOON] -
    (INST) <-- [EAT] -
    (OBJ) --> [WALNUT] --> (PART) --> [SHELL : *y].
    (AGNT) --> [MONKEY] ,
    (MATR) --> [SHELL : *y]
```

In accordance with embodiments that uses a tuple based notation, the CG shown above can be rendered as a tuple based conceptual graph (TCG) as follows:

```
@CG1 : {
    AGNT (EAT, MONKEY),
    OBJ (EAT, WALNUT),
    INST (EAT, SPOON),
    MATR (SPOON, SHELL),
    PART (WALNUT, SHELL)
}
```

The tuple notation behaves as though all the conceptual relations are simultaneously the head of the CG, without taking favorites, or making any less accessible for a searching agent. Any subset of the CG can be isolated and used as a means for search and retrieve, or a JOIN with another utterance. At the same time, no foreign variables have been introduced. The 'x' and 'y' from the first order logic rendering were not present anywhere in the common everyday usage of the English sentence.

It will be noted that in the above rendering there is usage of a '1' and '2', which could be confused with variables. However, these are not strictly variables, but are instead instance designators (i.e., one shell is different from the other shell). In the logic rendition, there is a "something" which has a value (hence a true variable).

Figure 5:
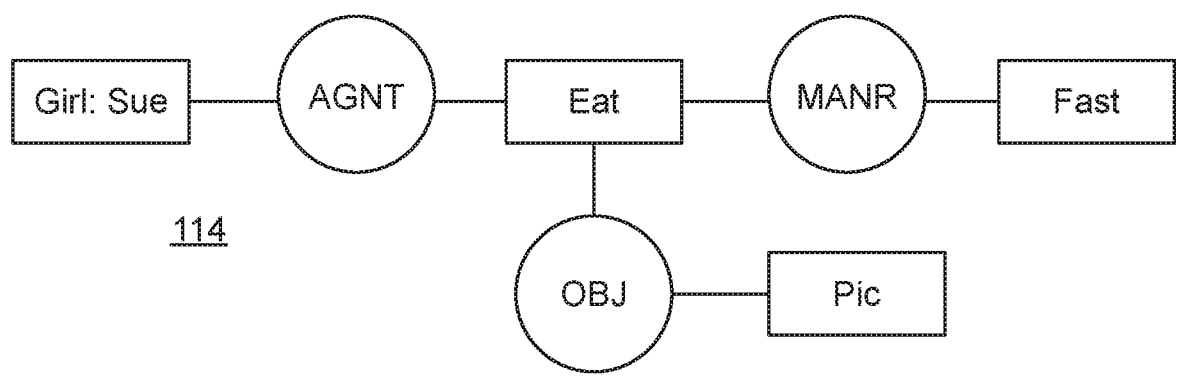

There are several different canonicity preserving operations for CGs, including the JOIN operation. When two separate CGs have a common concept node, they may be JOINed by merging the identical concept nodes together. Consider the two Conceptual Graphs 110 shown in FIG. 4. As shown therein, the concept node [GIRL], and the concept node [PERSON: Sue], can be merged after the node [PERSON: Sue] is restricted to the node [GIRL: Sue]. After removing redundant links, the resulting CG 114 shown in FIG. 5 is obtained. The JOIN operation allows for two complementary CGs to be JOINed. However, simply because two CGs are compatible, does not mean that they describe the same event. Similarly, just because a JOIN can occur, does not mean that it should. In the example above, a girl other than Sue might be eating a tomato fast.

Figure 6:
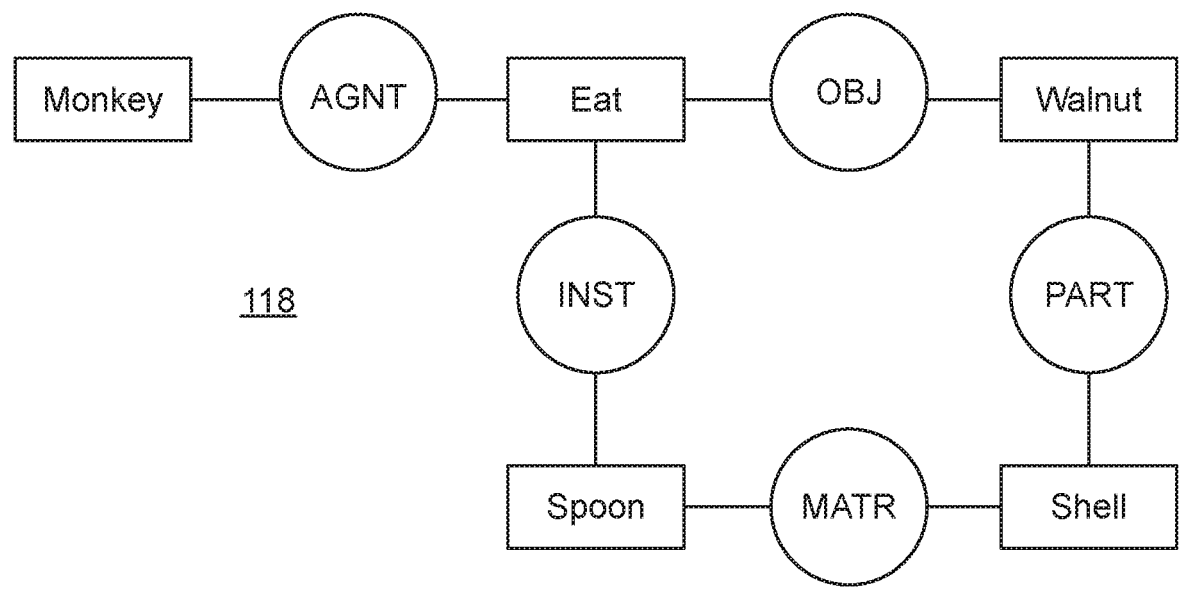

A CG can be considered a collection of relations over concept nodes. In accordance with embodiments, recasting a standard CG in a tuple based notation as a TCG makes it more compact, and also facilitates matching. For example, the CG 118 shown in FIG. 6 has 10 nodes, 10 edges, and 1 cycle. When recast as a TCG, it has 5 nodes, no edges, and no cycles:

```
@CG1 : {
    AGNT (EAT, MONKEY),
    OBJ (EAT, WALNUT),
    INST (EAT, SPOON),
    MATR (SPOON, SHELL),
    PART (WALNUT, SHELL)
}
```

The TCG form allows the nodes to be more specific, and as such easier to match. Subgraph matching also becomes easier, and can be performed in linear time, rather than exponential. As far as possible, graphs are parsed as sets. As such, the order of their "arms" (or the relationships) can appear in any order, without loss of content. The relations can be sorted based on their lexicographic value, breaking ties with argument order. Upon comparison, it is not necessary to backtrack, and processing of the relations (i.e. tuples) is performed in order of processing, which is proportional to the number of clauses and is by definition, the linear cost.

Any tree, or graph, or any connected component structure is expressible as a TCG, since even in the absence of relations over the nodes, the mere connection is the most primitive (and only) relation; that is, the (CONNECTED) relation. A CG can be considered a collection of JOINS on a set of relations. The relations are an ordered n-tuple of concept nodes with a relation label. The nodes (the concepts, which are arguments of the conceptual relations) are stored in a partially ordered hierarchy. Each node needs be stored only once, and each use of it is a pointer, not another copy. In addition to those conceptual relations illustrated above, examples of other conceptual relation types 120 are shown in FIG. 7, and are further described in "PRACTICAL NATURAL LANGUAGE PROCESSING QUESTION ANSWERING USING GRAPHS", PhD dissertation by Gil Emanuel Fuchs, University of California Santa Cruz, December 2004, which is herein incorporated by reference; although it will be evident that additional and/or different conceptual relation types can be used in accordance with other embodiments.

Introduction to Link Grammar

As described above, in accordance with an embodiment, the system uses a link grammar lexicon to generate a syntax intermediary from an input text, which is subsequently converted to a semantic rendering. To better describe the use of the link grammar lexicon, a brief introduction to the use of link grammar is provided herein.

Figure 8:
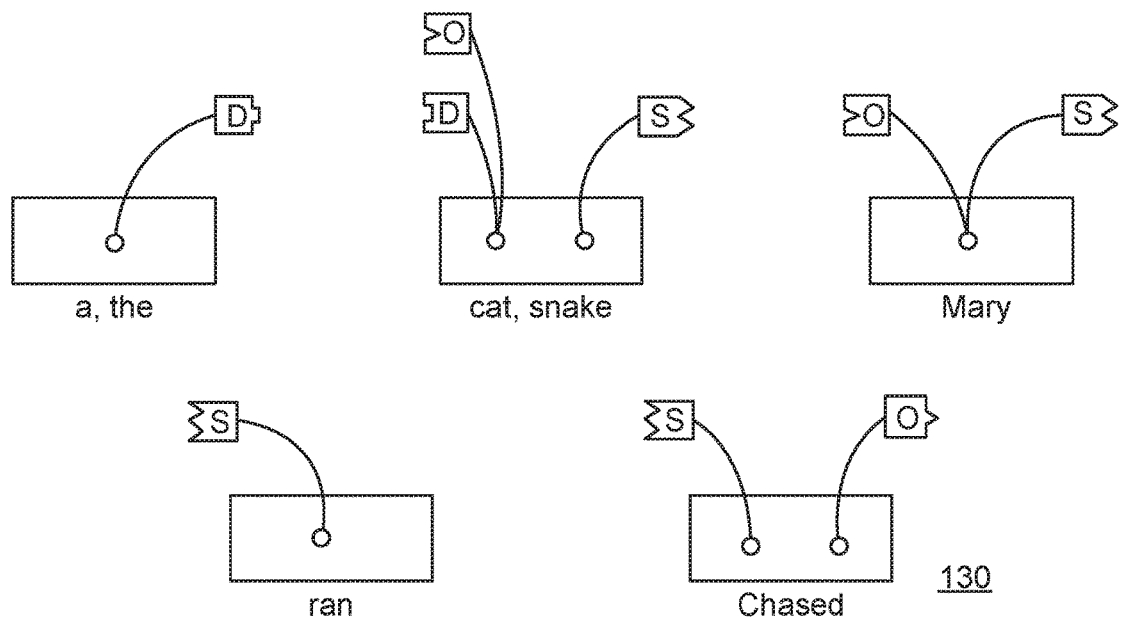
FIG. 8 shows various illustrations of link grammar lexicon entries.

FIG. 8 shows pictorially an example 130 of a linking requirement for a few simple words. As shown in FIG. 8, each of the labeled shapes is a connector. A connector is satisfied when connected to a matching connector with the same label but pointing in the other direction. In FIG. 8 there are labeled connectors, which for purposes of illustration have different shapes. For example, the connector of the S variety has one type of a shape when it points to the right, and another when it points to the left. These shapes are complementary, i.e. are made for, and can only connect with, each other (e.g. a right pointing O would not be able to hook to a left point S. Similarly, only a right pointing S can hook to a left pointing S). A linkage between words can only be made if they agree on what they are looking for. An example of the above would be: a noun would link to a determiner on the left that is looking for a noun on the right. The links are not directed links, i.e. there is no meaning to where the link is coming from or going to. The link is just a connection between two items, i.e. if a word has a right pointing halflink, then it can only hook to words with left pointing half-links which are to its right. A word with a right pointing halflink cannot hook up to words on its left. When more than one connector emanates from the black dot in the box, exactly one connector must be used. Connecting a pair together is equivalent to drawing a link between a pair of words.

Figure 9:
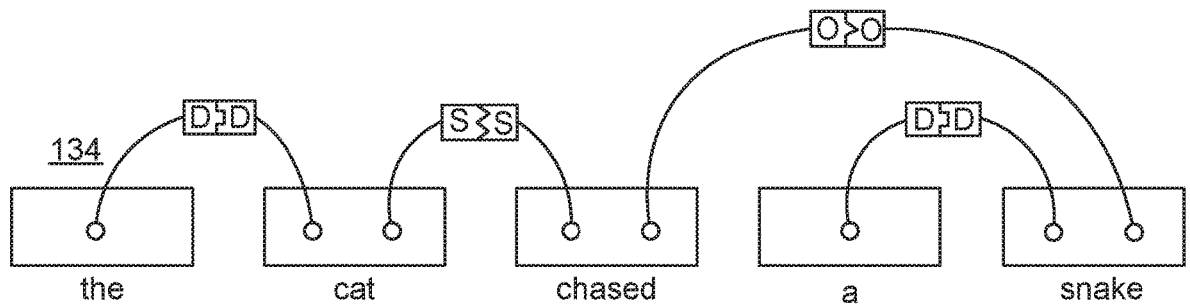
FIGS. 9-10 illustrate typical sentences and the linkages produced by a link grammar lexicon and the link grammar methodology.

FIG. 9 shows a satisfied linked sentence 134. An ungrammatical sentence, theoretically, should not be able to be satisfied. Of course, in practice, this is not really the case, but the attempt is to achieve a grammar that can capture most situations. In accordance with an embodiment, a dictionary of linking requirements is provided in the chosen language, for example:

| words | formula |
| --- | --- |
| a, the | D+ |
| snake, cat | D- & (O- or S+) |
| Mary | O- or S+ |

| words | formula |
|---|---|
| ran | S– |
| chased | S– & O+ |

The formulas in the linking requirement dictionary comprise the operators &, or, parentheses, and the connector names. The + and – designate the direction of the connector in relation to the words to which it is attached. The & operator requires both conjucts to be satisfied, whereas the or operator requires exactly one of the disjuncts to be satisfied. The order of the arguments of the & is significant. The farther left a connector is in the expression the closer a binder it is. For example, in FIG. 9 the word snake is closer to its determiner (left pointing D– link), than the word for which it is an object (left pointing O–). There are many ways to combine the links of the satisfied linkage, and therefore cause the linkage to be unsatisfied. For example, the left determiner connection of 'snake' could go all the way to 'the' instead of binding with the 'a'. That would result in an unsatisfied linkage. In this particular case it would also violate the requirement that the left-word of the 'O' link must be farther out than the left-word of the 'D' link.

Figure 10:
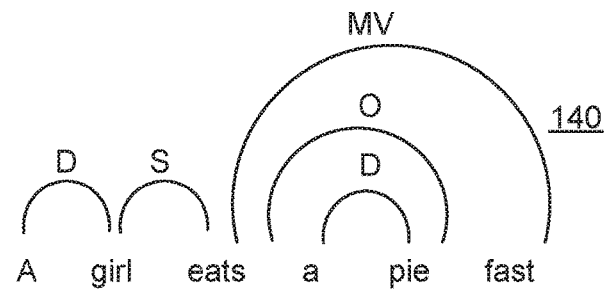

FIG. 10 shows an example of a sentence as it might be parsed using a link grammar lexicon and methodology. In the example 140 shown in FIG. 10, the sentence "A girl eats a pie fast" has a number of linkages as determined by the link grammar lexicon. In accordance with an embodiment, semantic rules can then be applied to this syntax, to allow the sentence to be expressed as a TCG shown below:

```
@CG1 : {
    AGNT (GIRL, EAT),
    OBJ (EAT, PIE),
    MANR (EAT, FAST)
}
```

In addition to those linkage elements illustrated above, examples of other linkage elements 142 are shown in FIG. 11, and are further described in "PRACTICAL NATURAL LANGUAGE PROCESSING QUESTION ANSWERING USING GRAPHS", PhD dissertation by Gil Emanuel Fuchs, University of California Santa Cruz, December 2004, which is herein incorporated by reference; although it will be evident that additional and/or different linkage grammar lexicons and/or linkage elements can be used in accordance with other embodiments.

Figure 13:
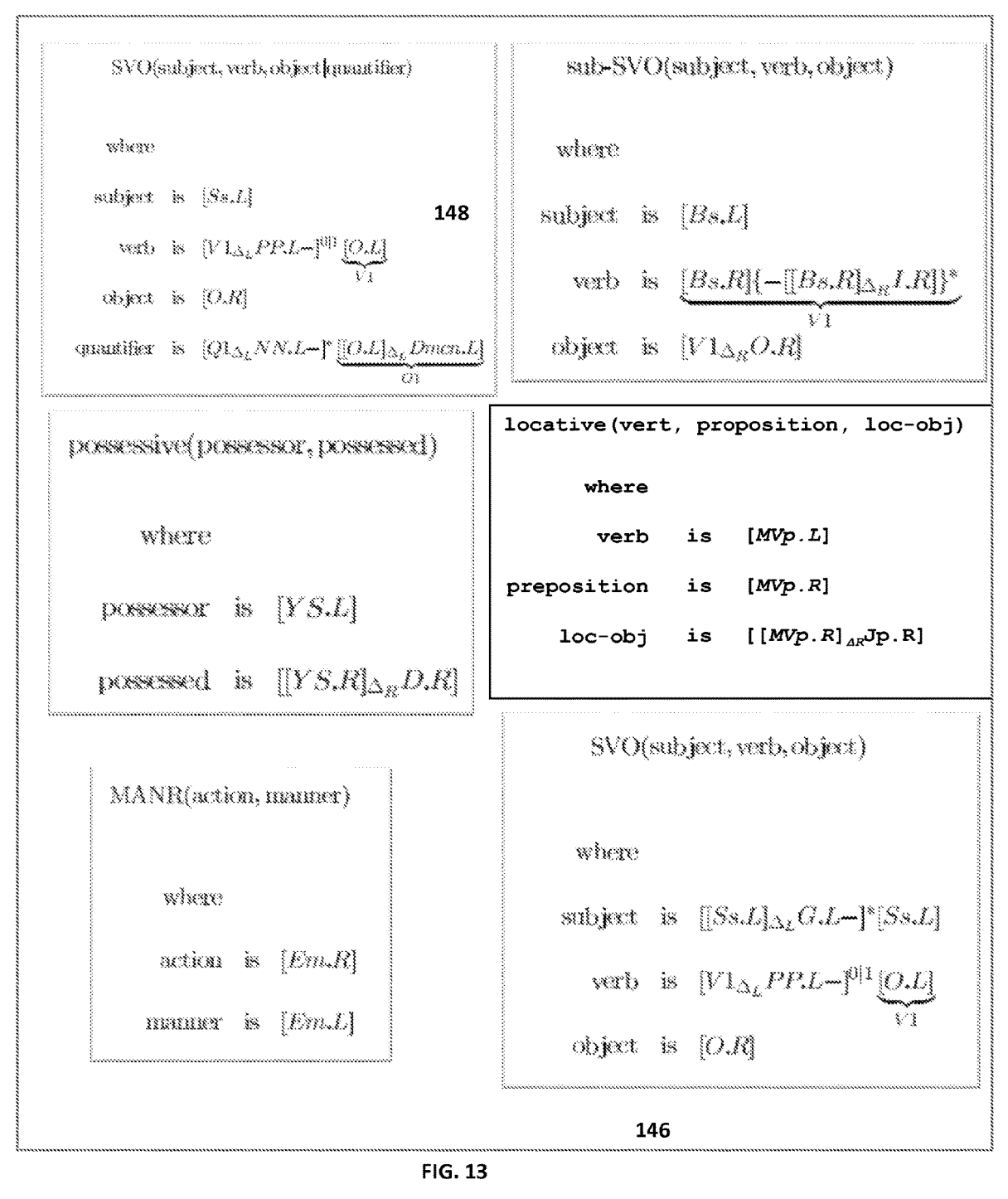

FIG. 12 illustrates an algebra for the use of semantic rules, in accordance with an embodiment; while FIG. 13 illustrates examples of semantic rules which can be used in accordance with an embodiment. It will be evident that, in addition to the examples shown herein, the system can use other linguistic elements in its link grammar lexicon, and other semantic rules, to best address the needs of particular implementations.

As shown in FIG. 12, an algebra can be defined and used to configure the system to apply the semantic rules by e.g. defining .L as the left word of a link; .R as the right word of a link; and $\Delta_L$ and $\Delta_R$ as instructions to the system to follow one of the links on the left or right respectively.

As shown in FIG. 13, a plurality of semantic rules 146 can then be defined and used to configure the system to apply the semantic rules by e.g. as shown by rule 148 for creating a (subject verb object) transformation.

The above algebra and rules are provided for purposes of illustration. Additional and/or different algebra and/or semantic rules can be used in accordance with other embodiments.

Introduction to Associative Databases

In accordance with an embodiment, the system uses an associative database to store a plurality of conceptual graphs, or TCGs. Within the associative database, entries are stored as nodes according to a hierarchy, such as one or more of a concept hierarchy, type hierarchy and relationship hierarchy. The hierarchies can be stored together within the database, or stored separately in the form of lookup tables or dictionaries or separate database structures. Before the system receives an input text, the type hierarchy, and relationship hierarchy are pre-defined. Hierarchies can be modified as necessary to suit particular implementations. As input text are received into the system and loaded into the database, the object hierarchy is populated with TCG corresponding to those input text.

Figure 14:
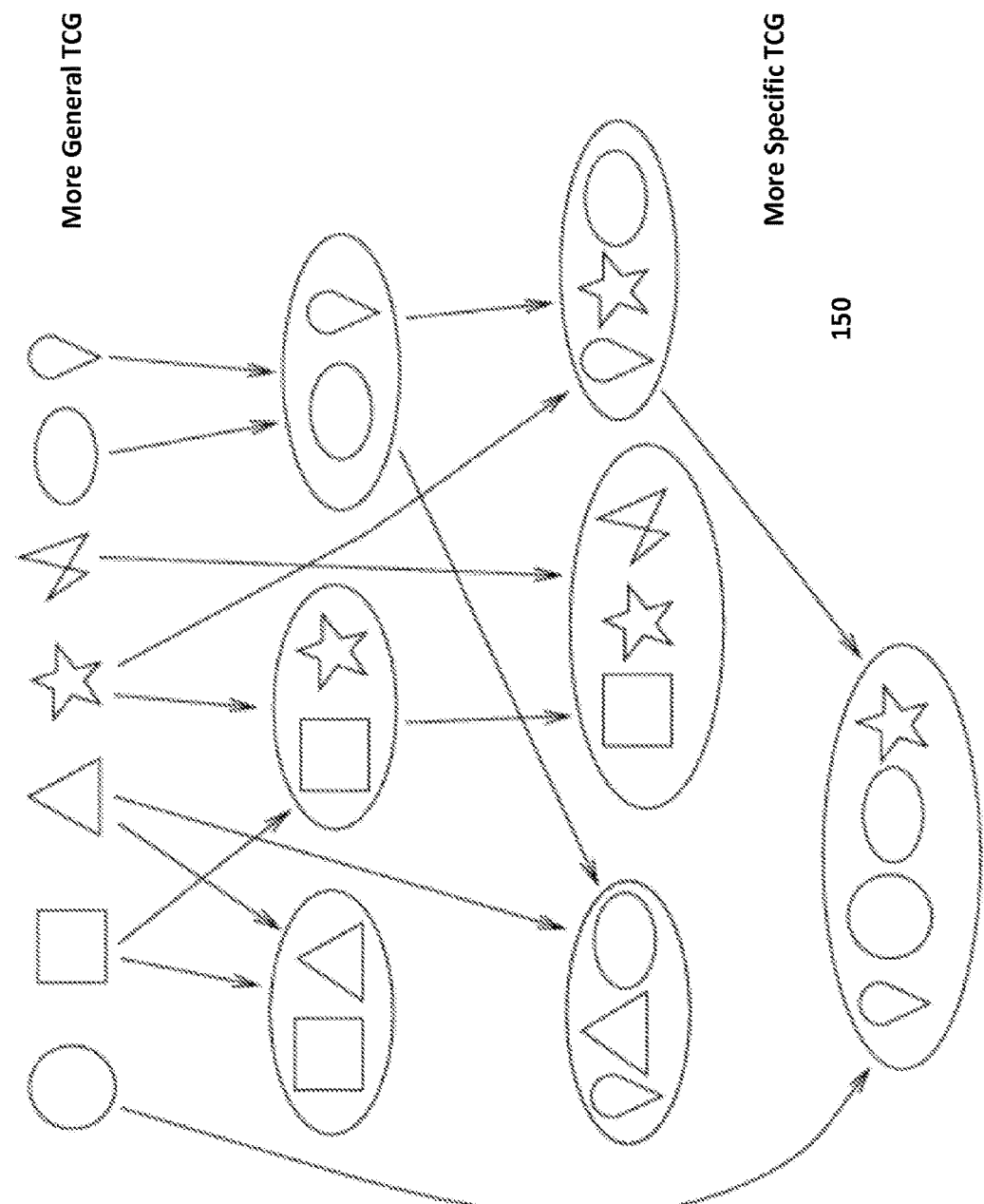
FIG. 14 illustrates symbolically how patterns are stored in an associative database, in accordance with an embodiment.

FIG. 14 illustrates symbolically how patterns (TCG or otherwise) are stored in an associative database, in accordance with an embodiment, from more general, to more specific. When the system attempts to match the TCG for an input text, with the TCG already stored in the database, it starts at the top of the hierarchy, and moves downward through the hierarchy to determine an appropriate match. In accordance with an embodiment, the system performs matching by looking for full or partial matches between relationships within the TCG, and creates new TCGs and corresponding semantic understandings using CG-JOIN operations. These techniques are described in further detail below.

Additional information describing various aspects and examples of conceptual graphs, link grammars, and associative databases are described in "PRACTICAL NATURAL LANGUAGE PROCESSING QUESTION ANSWERING USING GRAPHS", PhD dissertation by Gil Emanuel Fuchs, University of California Santa Cruz, December 2004, which is herein incorporated by reference. It will be evident that other types of, e.g. link grammars, lexicons and rules, can be used in accordance with various implementations, and that the invention is not limited to the precise forms disclosed herein.

Transformation of Input Text to Semantic Rendering

In accordance with an embodiment, the system can include a component or process for expressing an input text to have a semantic rendering or meaning, comprising including receiving an input text expressed as a plurality of sentences, each of which sentences includes a plurality of words, parsing the input text using the link grammar methodology and lexicon, to determine a syntax within the input text, including linkages between the words, and using a set of semantic rules to transform the syntax to a semantic rendering or meaning, wherein each rule maps a particular linkage type or words in the input sentence to a semantic relationship component, or to a concept node participating in a semantic relationship component, respectively.

Figure 15:
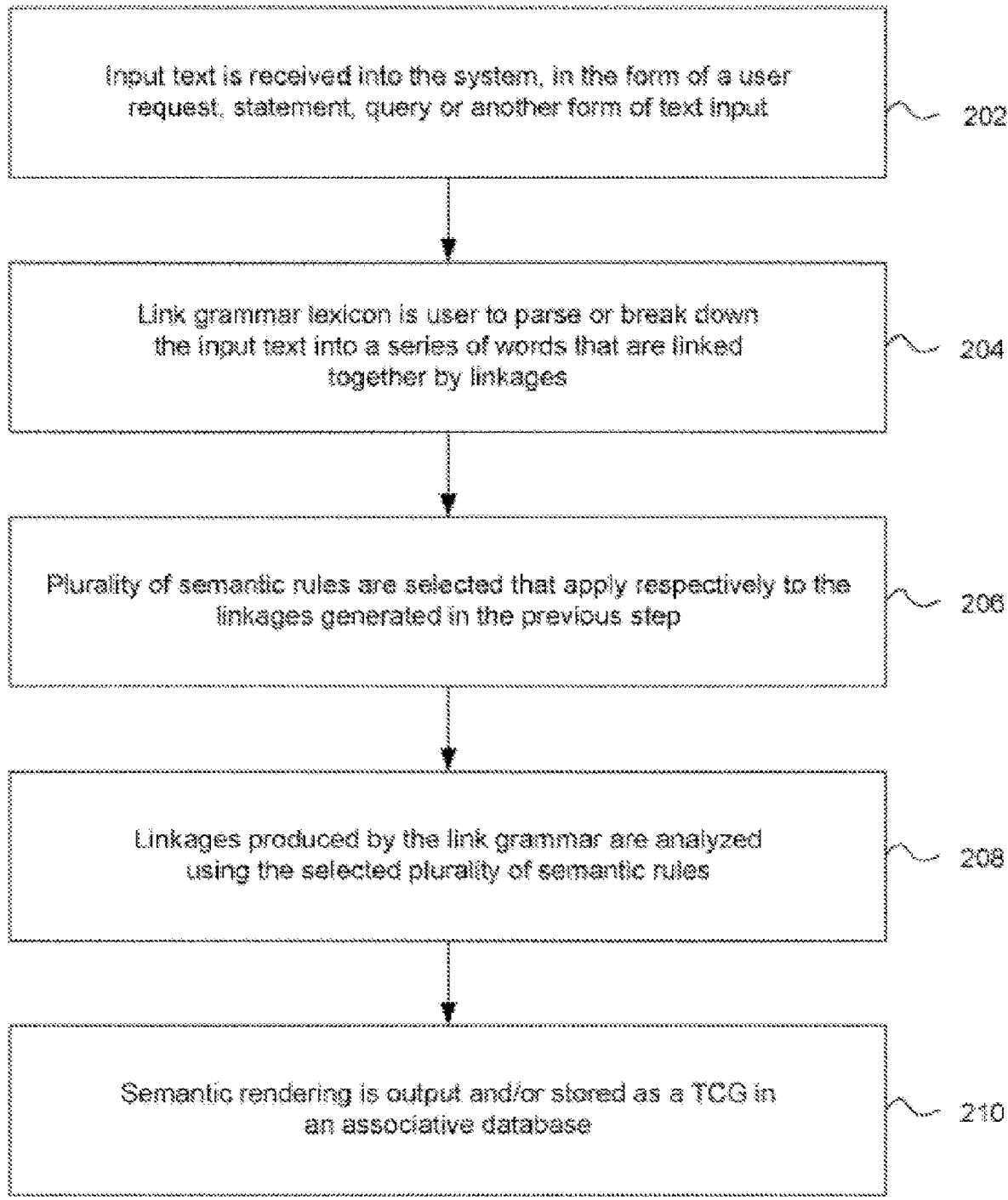
FIG. 15 shows a flowchart of a process for transforming an input text to a semantic rendering, in accordance with an embodiment.

FIG. 15 shows a flowchart of a process for transforming an input text to a semantic rendering, in accordance with an embodiment. As shown in FIG. 15, in steps 202, an input text is received into the system. This can be in the form of a user request, a query to a search engine, a retrieval of text information as part of an offline process, or any other form of text input. In step 204, a link grammar lexicon and methodology is user to parse or break down the input text into a series of words that are linked together by linkages. Any satisfactory link grammar lexicon can be used, including different lexicons for different languages. Generally, the link grammar lexicon specifies a hundred or so different relationships between words, which is sufficient for most purposes. The link grammar lexicon can be augmented with additional relationships as necessary. In step 206, a plurality of transformative semantic rules are then automatically selected which apply respectively to the linkages generated in the previous step. Different linkages will generally require different rules to allow that linkage to be expressed in a semantic rendering. The rules are algebraic, in that they can be added or applied in a successive manner if they are applicable. In step 208, the linkages produced by the link grammar are analyzed using the selected plurality of rules. In step 210, once all of the linkages have been transformed using their equivalent rules, a semantic rendering can be output and/or stored, which is equivalent to the input text, but which has a CG-like semantic rendering or meaning. In accordance with an embodiment, the semantic rendering output is stored as a CG in an associative database, including the use of any of the additional techniques described below.

Generation and Linearization of Conceptual Graphs

In accordance with an embodiment, the system can include a component or process for creating a linearized tuple based rendering of a conceptual graph (TCG) for use in expressing an input text as having a semantic rendering or meaning, including receiving a plurality of semantic relationships expressed as a conceptual graph and corresponding to the input text, and storing the plurality of tuples as a tuple conceptual graph (TCG) together with a unique name or other TCG identifier.

Figure 16:
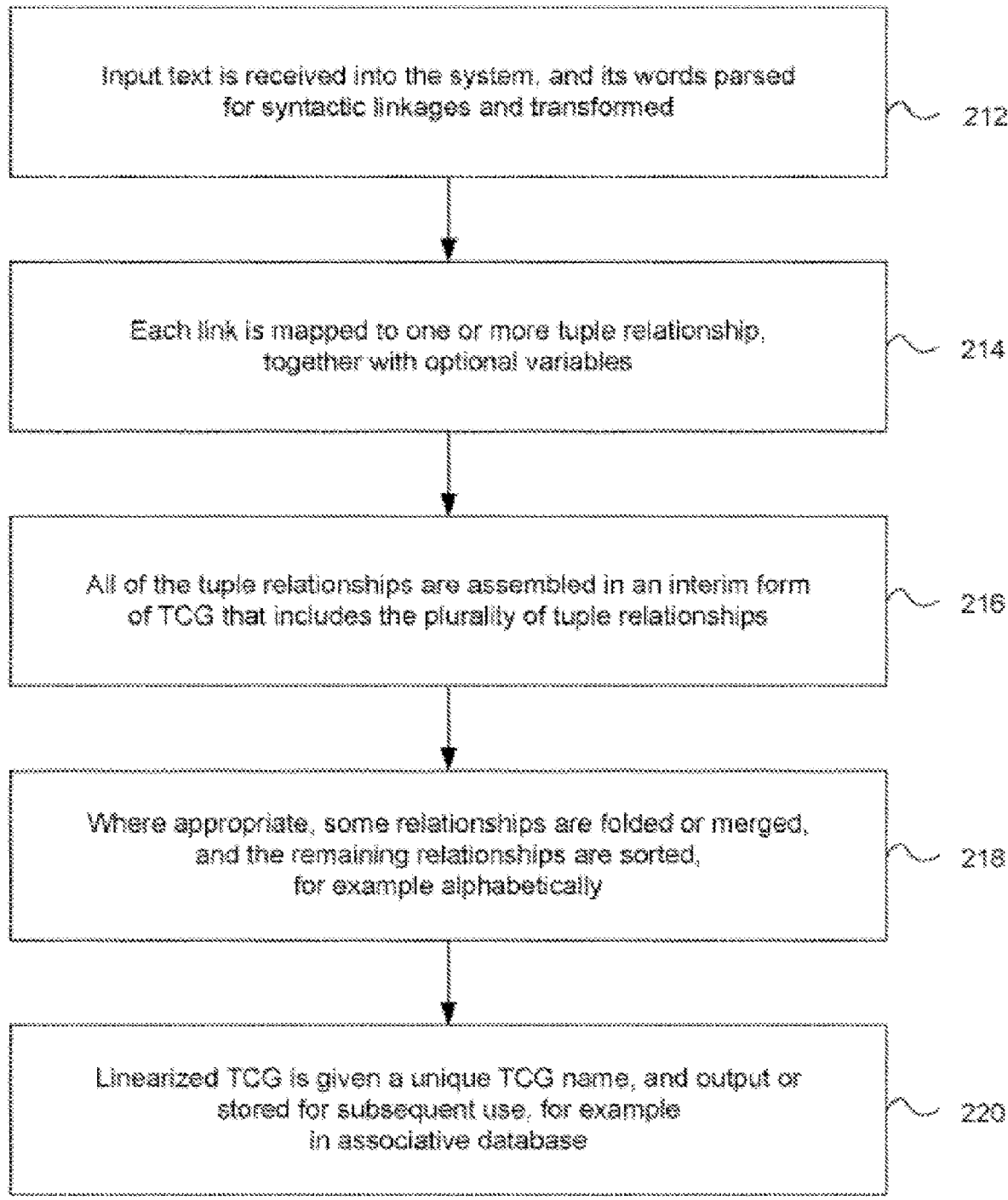
FIG. 16 shows a flowchart of a process for creating a linearized tuple based rendering of a TCG in accordance with an embodiment.

FIG. 16 shows a flowchart of a process for creating a linearized tuple based rendering of a TCG in accordance with an embodiment. As shown in FIG. 16, in step 212, an input text is received into the system, and its words parsed for linkages and transformed, using a link grammar lexicon and semantic rules, and in accordance with the process described above in FIG. 15. In step 214, the result of parsing and transforming is that each link is mapped to one or more tuple relationship, together with optional variables. A tuple relationship with its optional variables can be likened to a single line item of the pictorial CG shown at the outset. In step 216, all of the tuple relationships are assembled in an interim form of TCG that includes the plurality of tuple relationships and which completely mimics the pictorial CG and characterizes the input text in a conceptual manner. However, at this point there may be duplicates or redundancies, and similar input text can produce quite different sets of tuple relationships. In step 218, where appropriate, some relationships are folded or merged, which reduces the overall size of the TCG, and the remaining relationships are sorted, for example alphabetically (with argument sorting as tie breaks). In step 220, the linearized TCG is given a unique TCG name, and output or stored for subsequent use, for example in an associative database.

To consider the example input text shown in FIG. 10, i.e. "A girl eats a pie fast". When the system parses this input text using the link grammar lexicon, it determines the linkages therein, namely D (two), S, O and MV linkages. In accordance with an embodiment, the D determiner links are ignored. The S link is then transformed, using one or more of the semantic rules, (such as, e.g. the rules shown and described above in FIG. 13), to yield an AGNT tuple relationship:

AGNT (Girl, Eat)

The O link is then transformed, again using one or more of the semantic rules, to yield an OBJ tuple relationship:

OBJ (Eat, Pie)

The MV link is then transformed, again using one or more of the semantic rules, to yield a MANR tuple relationship:

MANR (Eat, Fast)

Finally, each of the tuple relationships generated above are assembled into a single, perhaps intermediate form of TCG:

```
@CG1 : {
    AGNT (Girl, Eat)
    OBJ (Eat, Pie)
    MANR (Eat, Fast)
}
```

Where appropriate, some relationships can be folded or merged, which reduces the overall size of the final TCG, and the remaining relationships are sorted, for example alphabetically:

```
@CG1 : {
    SVO (Girl, Eat, Pie)
    MANR (Eat, Fast)
}
```

The linearized TCG is then output or stored for subsequent use, for example in an associative database.

Full and/or Partial Comparison of Linearized Tuple-Based Conceptual Graphs

In accordance with an embodiment, the system can include a component or process for comparing a plurality of tuple conceptual graph (TCG), including matching a first tuple conceptual graph (TCG), together with a first name or other TCG identifier and a first set of linearized tuples, with a second TCG to determine a full or partial match results between the tuples; and reporting the results of the full or partial match. In accordance with an embodiment, the CG compare operator between two candidate TCGs (which answers the question: is TCG1 more general than TCG2?) can be summarized by the following algorithm;

1. Bring both TCGs into a canonical representation format, which includes sorting tuples alphabetically, and by first argument upon ties, second argument upon further ties, etc.
2. Set the NOT-EQUAL flag to false.
3. If TCG1 has more tuples than TCG2, it cannot be more-general-than TCG2. Abort early, return (false).
4. If TCG1 has a relationship which is not in TCG2, abort early, return (false).
5. For each relationship in TCG1 do:
   a) Find a candidate matching relationship in TCG2 (i.e. same tuple name). If not found, then abort early, return (false). Else continue.
   b) For each argument in the relationship do i. If argument in TCG1 is equal OR is ontologically more general than the argument of equivalent place in TCG2, then continue, else exit from this loop level, do not abort, but go on to item (c). If not exited early and argument of TCG1 was ontologically more general (as opposed to equal) then set the NOT-EQUAL flag to true.
   c) If previous attempted relationship failed, try another candidate in TCG2 (i.e. still same tuple name, if any are still left) and go to (b), if none left, abort early, and return (false).
   d) If previous attempted relationship succeeded, then move on to next relationship in TCG1, proceed with (5).

6. If the NOT-EQUAL flag is false, then TCG1 and TCG2 are equal, otherwise return (true).

If the Q1 query TCG is compared to the declarative TCG, it will come out as more-general-than, and as such find it as an answer.

Figure 17:
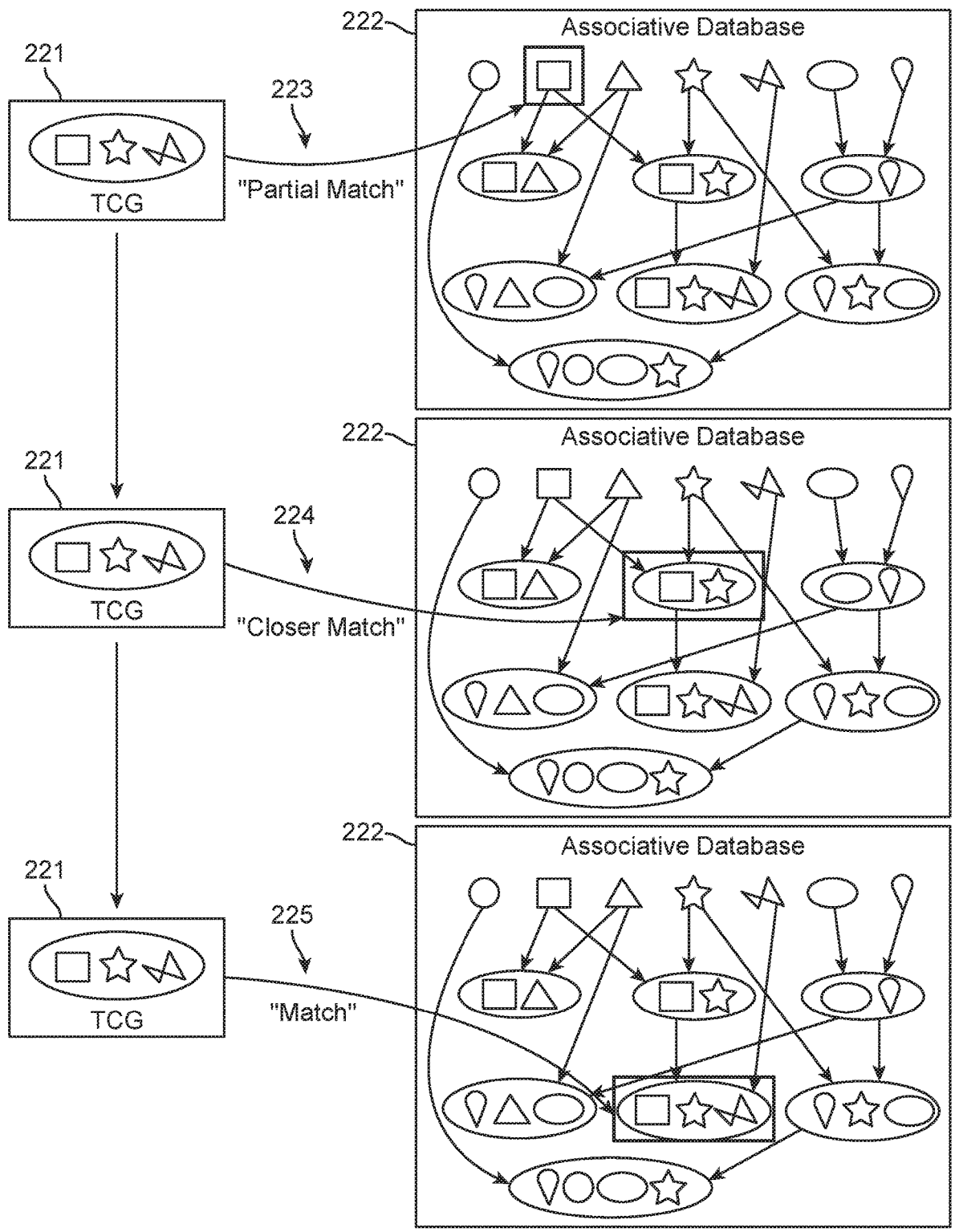
FIG. 17 illustrates a process for providing full or partial comparison of linearized TCG in accordance with an embodiment.

FIG. 17 illustrates a process for providing full or partial comparison of linearized TCG in accordance with an embodiment. As shown in FIG. 17, in accordance with an embodiment, the TCG can be organized or sorted in such a manner (generally hierarchically, for example as an associative database) so that one, e.g TCG is logically below another TCG within a branch of the hierarchy if that (lower or child) TCG is a more specific version of its (higher or parent) TCG. As the hierarchy is descended down a particular branch, the related TCG become increasingly more specific. In accordance with an embodiment, this allows a TCG 221 to be successively compared 223, 224 to the other TCG 222 (e.g. in an associative database) from the top down through the branches of that TCG hierarchy until it locates increasingly closer matches 224.

Figure 18:
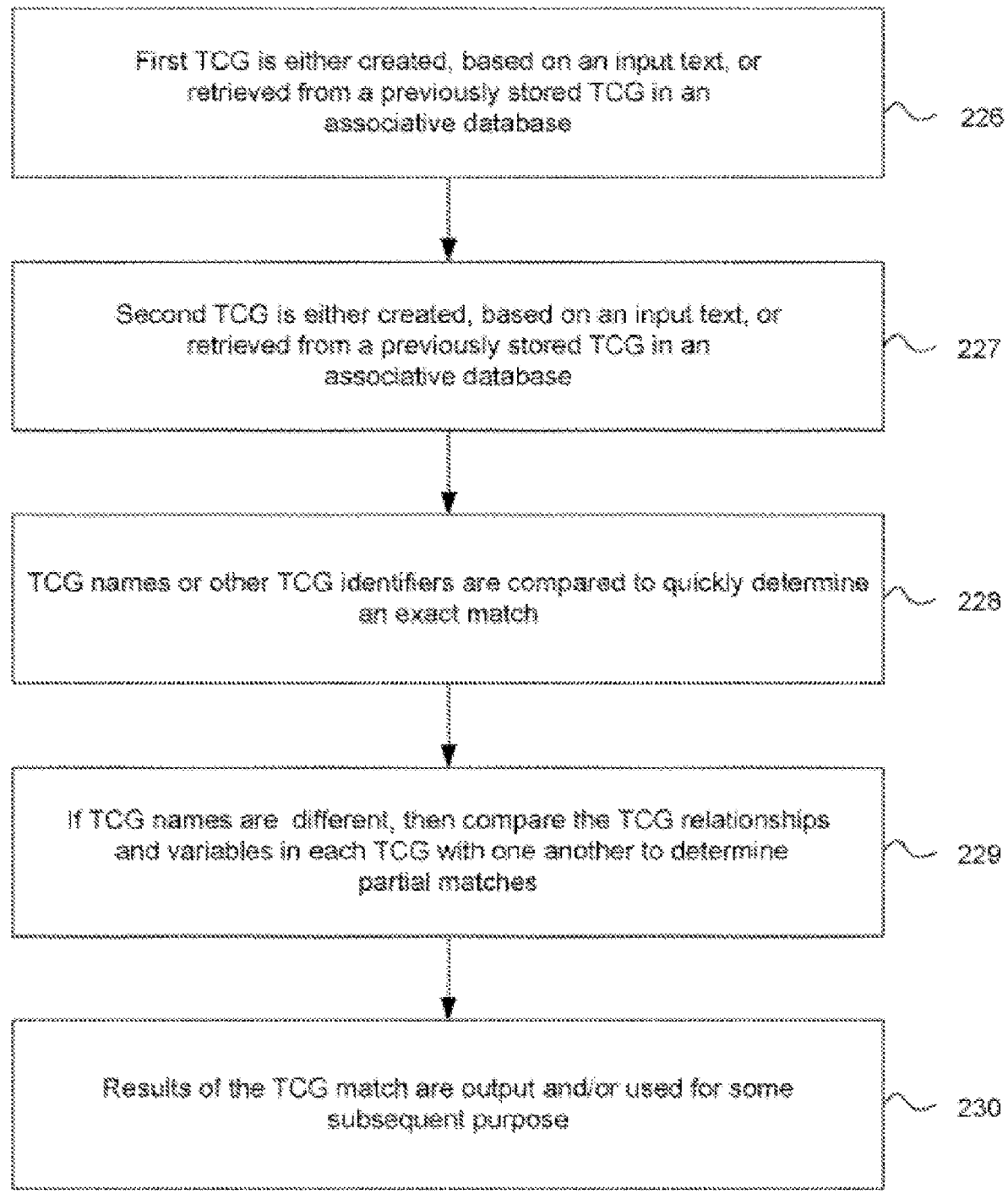
FIG. 18 shows a flowchart of a process for providing full or partial comparison of linearized TCG in accordance with an embodiment.

FIG. 18 shows a flowchart of a process for providing full or partial comparison of linearized TCG in accordance with an embodiment. As shown in FIG. 18, in step 226, a first TCG is either created, based on an input text, or retrieved from a previously stored TCG in an associative database. In step 227, a second TCG is again either created based on an input text, or retrieved from a previously stored TCG in an associative database. In step 228, the TCG names (if alphabetical sorting or ordering is used), or other TCG identifiers (if a different sorting or ordering criteria is used), are compared to quickly determine an exact match. If the names (or other sorting criteria) match, then they are the same TCG, and the process can end prematurely. In step 229, if it is found that the TCG names are different, then the TCG relationships and variables in each TCG are compared with one another to determine matches. Since the relationships within each TCG are linearized and sorted, e.g. alphabetically, matches between two TCGs can be quickly determined. Partial matches indicate close semantic relationships between the two TCGs, which can be useful for many purposes, such as suggesting results to search queries, or advertising similar and/or related products. In step 230, the results of the TCG match are output and/or used for some subsequent purpose. It is important to note that since the TCG are ordered or sorted either alphabetically by name or according to some other sorting or ordering criteria, the comparison of one TCG against the others does not require backtracking, and the overall comparison and/or search step is substantially reduced from a value of approximately $N_2$ to approximately N iterations (where N is the total number of tuples in a TCG against which the comparison is made).

Associative Database for Use in Rendering TCG without Duplication

In accordance with an embodiment, the system can include a component or process for storing and retrieving text within a database, the text having a semantic rendering or meaning in a TCG, including providing a database content and a tuple conceptual graph (TCG) hierarchy, relation hierarchy, and node hierarchy; receiving a TCG rendering of an input text expressed as a plurality of sentences or as a query, each of which includes a plurality words therein; accessing the database of previously stored plurality of tuple conceptual graph (TCG) corresponding to other texts; and matching the tuple conceptual graph (TCG) and the tuples within it corresponding to the input text with the database content according to the TCG hierarchy, relation hierarchy, and node hierarchy, to determine an appropriate location for subsets of information within the input text within the database.

Figure 19:
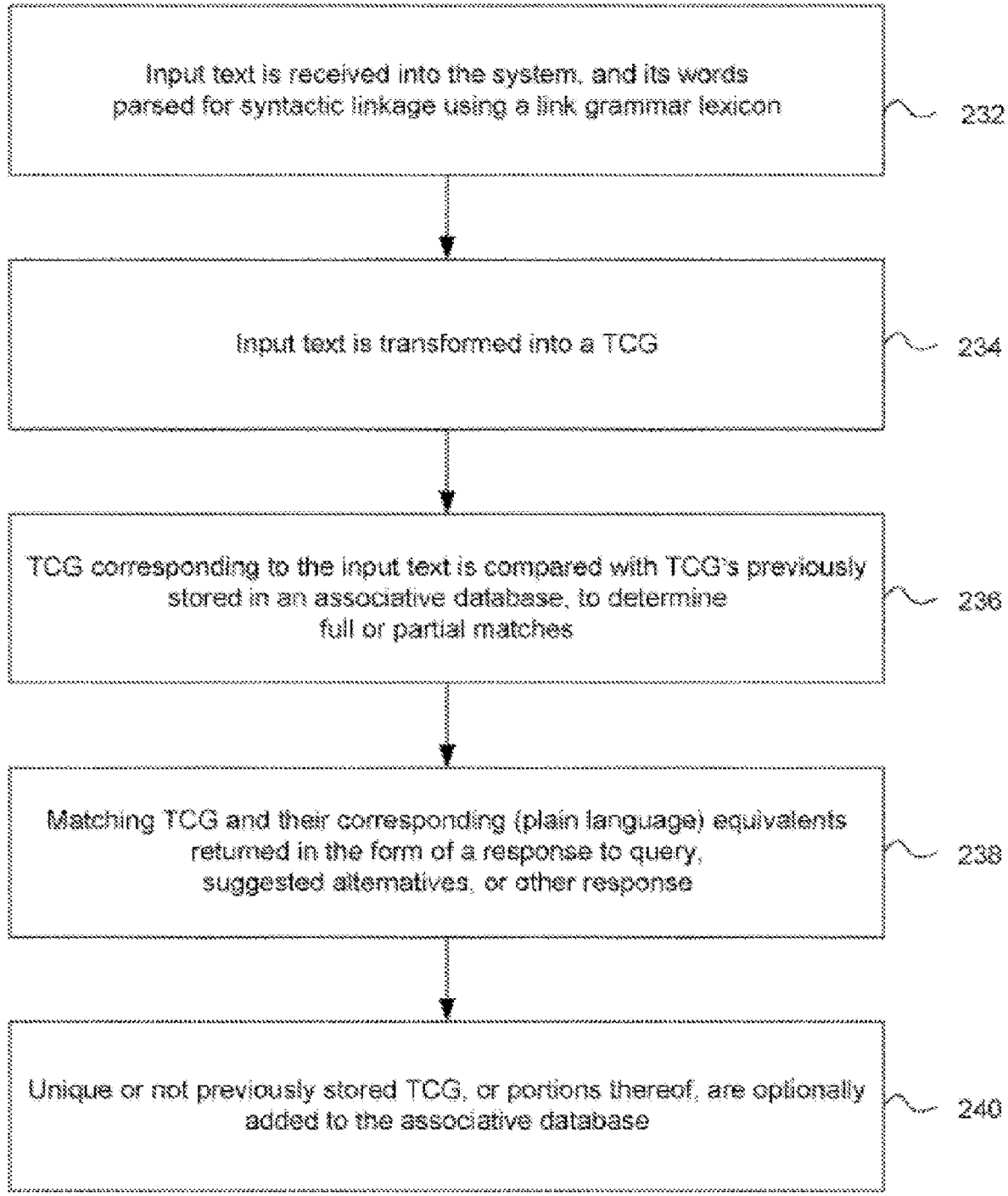
FIG. 19 shows a flowchart of a process for storing and retrieving text within a database, the text having a semantic rendering or meaning in a TCG, in accordance with an embodiment.

FIG. 19 shows a flowchart of a process for storing and retrieving text within a database, the text having a semantic rendering or meaning in a TCG, in accordance with an embodiment. As described above, in accordance with an embodiment, an associative database (ADB) is considered a database that is capable of housing any types of objects or other data contents, and is organized in such a manner (generally hierarchically) that one, e.g TCG is below another TCG within a branch of the hierarchy if that (lower or child) TCG is a more specific version of its (higher or parent) TCG. For example, the TCG concept that "animals are brave" may be higher that the TCG concept "cats are brave", which is a related, but more specific concept, and as such would appear lower within the same branch of the TCG hierarchy. As the database hierarchy is descended down a particular branch, the related TCG become increasingly more specific. In accordance with an embodiment, this allows a TCG to be added to the ADB at the top or root of the ADB's hierarchy, and successively compared, using the above-described comparison techniques, to TCG from the top down through the branches of that TCG hierarchy until it meets a match, or can be located within the hierarchy as a new TCG in a new location within the ADB. For example, depending on the particular implementation, a match at a particular level may be the "result" searched for, or it may represent the "new data" to be added to the database.

As shown in FIG. 19, in step 232, input text, or example in the form of a user query, is received into the system, and its words are parsed for linkages using a link grammar lexicon, in accordance with the process described above in FIG. 11. In step 234 the input text is then transformed into a TCG, in accordance with the process described above in FIG. 12. In step 236, the TCG corresponding to the input text is compared with TCGs previously stored in an associative database, using full or partial matching techniques as described above in FIG. 13. This step is then repeated down through the hierarchy of the associative database. In accordance with an embodiment the associative database includes a tuple conceptual graph (TCG) hierarchy, relation hierarchy, and node hierarchy, each of which can be stored together, or separately, and used to optimally match the TCG. In step 238, if a match is found, then matching TCG and their corresponding (plain language) equivalents can be returned to, e.g. the user in the form of a response to their query, or depending on the particular implementation, suggested alternatives, advertised products, recommendations for similar interests, etc. In step 240, if the TCG is determined to be unique or not previously stored in the associative database, then depending on the particular embodiment, the unique TCG or portions thereof are optionally added to the associative database to increase its overall knowledge. By employing the quicker linearized techniques of comparing, the overall goal is served faster and therefore becomes doable in "internet speed".

Association and Searching of Information from Multiple Sources

In accordance with an embodiment, the system can include a component or process for discovering, storing and retrieving text within a database according to a semantic hierarchy, including providing a database content and a tuple conceptual graph (TCG) hierarchy, relation hierarchy, and node hierarchy; receiving an input text which includes a plurality of phrases and words therein; using a set of semantic rules to transform the syntax to a semantic rendering or meaning; comparing tuples in the input text with the database content; and performing TCG joins where appropriate, based either on partial tuple overlap or over any concept node argument to tuple information which comes from different sources, to combine content within the database into new TCG reflecting new semantic information not fully or directly present in any individual textual source or previously stored in the database. New knowledge is created either by combinational methods or by deductive means of the individual TCG relations by means of a JOIN operation or inference rule lookup and execution, respectively.

Figure 20:
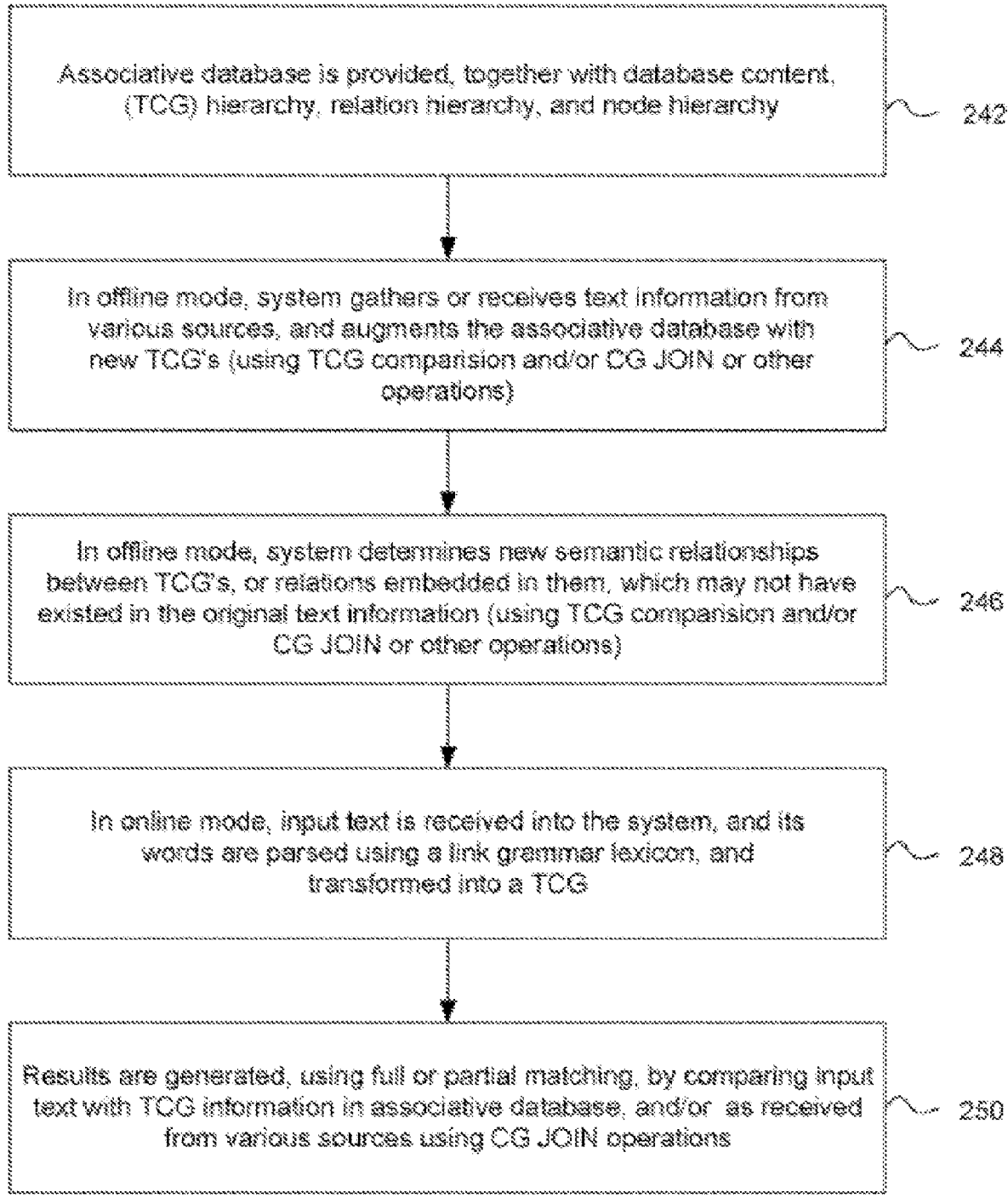
FIG. 20 shows a flowchart of a process for storing and retrieving text within a database according to a semantic hierarchy in accordance with an embodiment.

FIG. 20 shows a flowchart of a process for storing and retrieving text within a database according to a semantic hierarchy of more general than in accordance with an embodiment. As shown in FIG. 20, in step 242, an associative database is provided, together with database content and a tuple conceptual graph (TCG) hierarchy, relation hierarchy, and node hierarchy. In step 244, in an offline mode, the system gathers or receives text information from various sources, and augments the associative database with new TCGs using the comparison and ADB matching and/or insertion techniques described above. In step 246, also in offline mode, the system determines new semantic relationships between TCGs, which may not have existed in the original text information but may be useful in responding to future queries. In step 248, in an online mode, input text, or example in the form of a user query, is received into the system, and its words are parsed for linkages using a link grammar lexicon and methodology, and then transformed into a TCG, using the techniques described above. In step 250, results are generated, using full or partial matching, by comparing the input text with the TCG information in the associative database both received from the various sources, linked during offline mode, or linked at the time of responding to the input text/query, using, e.g CG JOIN operations. A CG JOIN operation has the effect of taking two or more TCG's that have something in common, and joining them to create new information, which can then be used as is, or stored in the database for future use.

Use in Natural Language Query Processor

Figure 21:
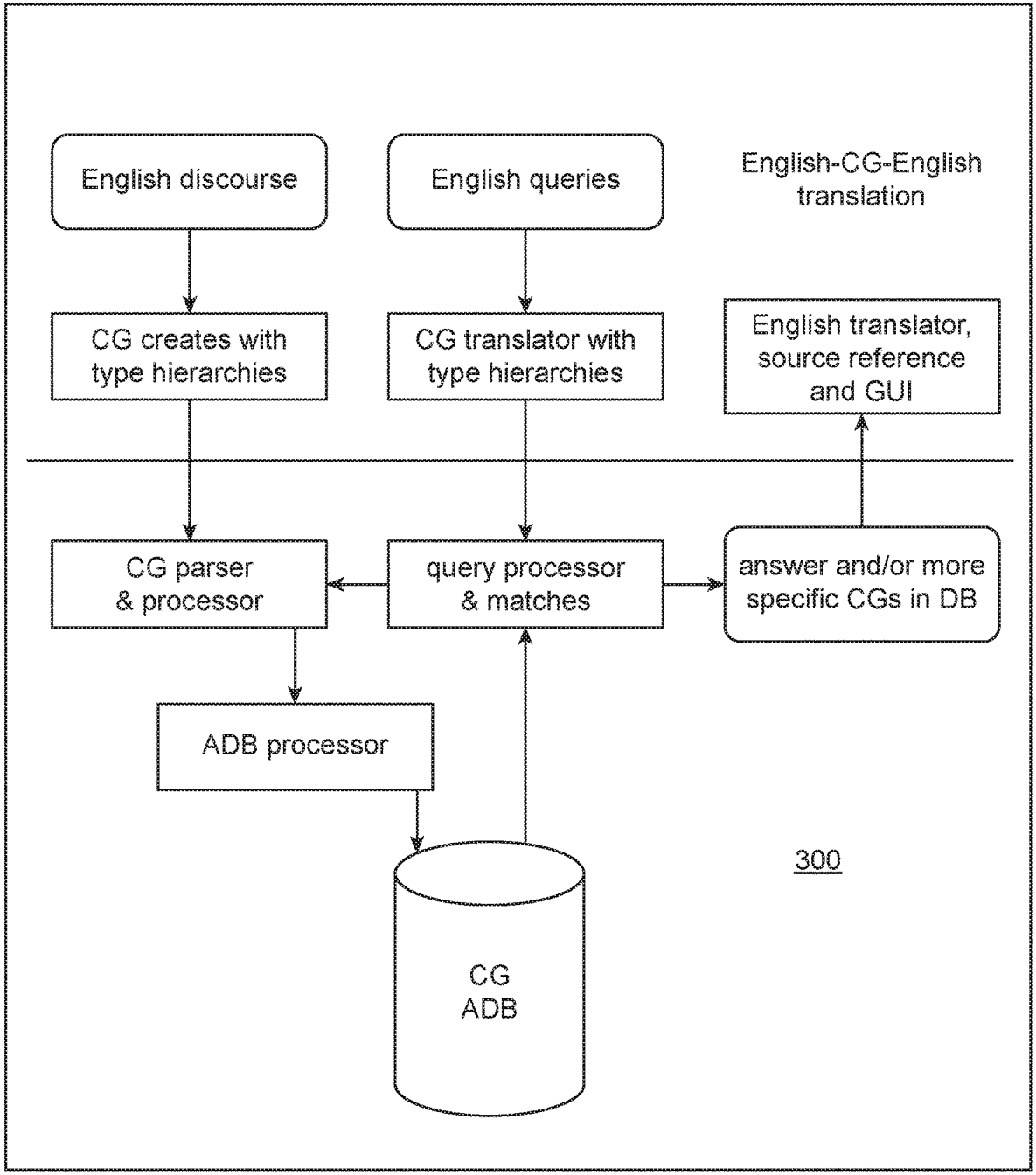
FIG. 21 shows an example of a natural language query processor in accordance with an embodiment.

In accordance with an embodiment, the techniques described above can be used in a natural language query processor. FIG. 21 shows an example of a natural language query processor 300 in accordance with an embodiment. As shown in FIG. 21, the system can allow for English language discourse between a user and a machine, such as an online system or a web-based interface, including queries and responses in a natural, English language, format. As queries are received, parsed, and transformed to CG (or TCG) using the above-described techniques, and are matched within the associative database, additional answers or more content can be continuously added to the database. Alternative languages can be used as desired.

Use of Semantic Understanding in Searching and Providing of Content

In accordance with an embodiment, the techniques described above can be used as part of a system and method for use of semantic understanding in searching and providing of content.

Figure 22:
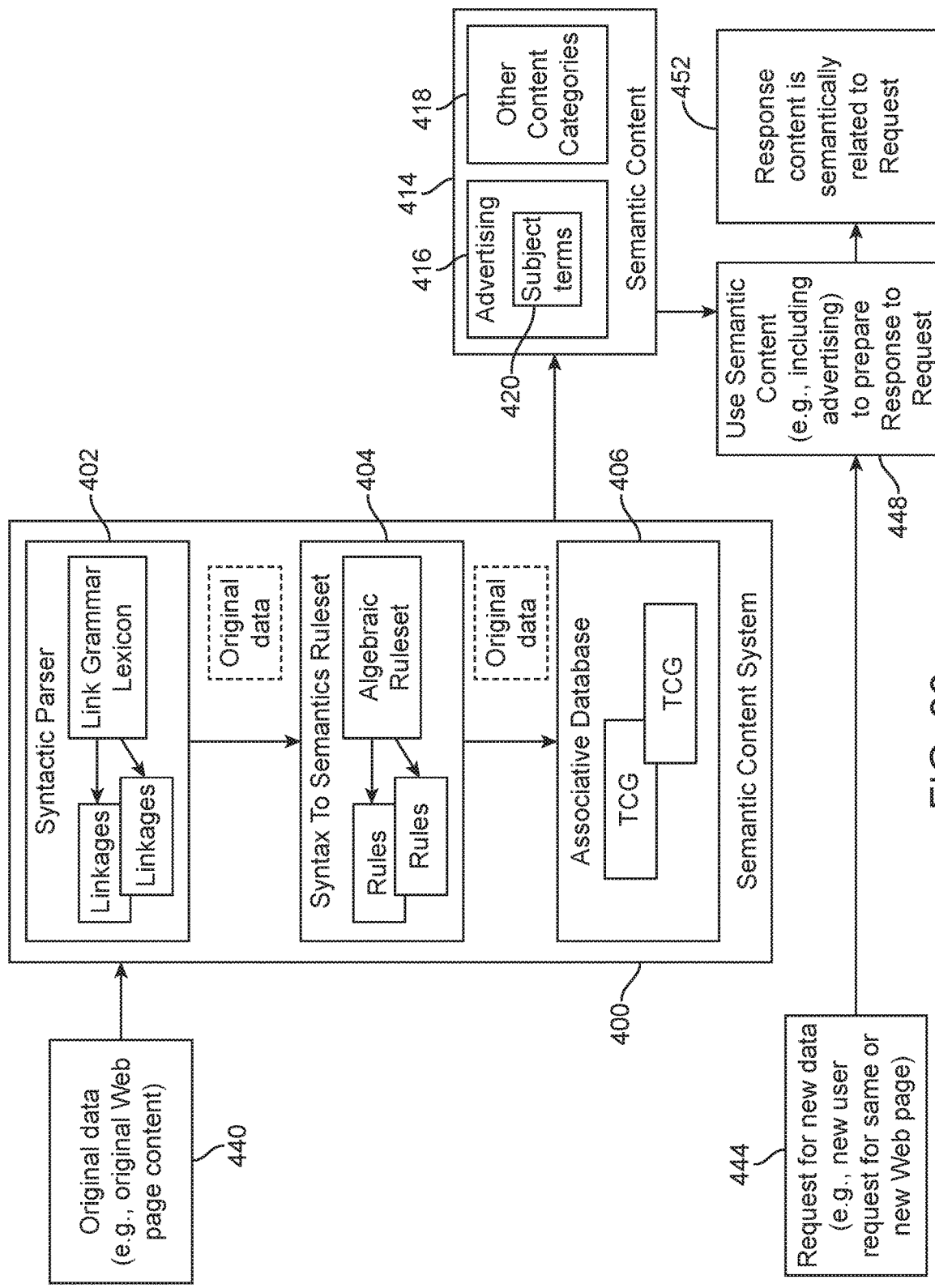
FIG. 22 shows a system for use of semantic understanding in searching and providing of content, in accordance with an embodiment.

FIG. 22 shows a system for use of semantic understanding in searching and providing of content, in accordance with an embodiment. As shown in FIG. 22, in accordance with an embodiment, a semantic content system 400 comprises a Syntactic Parser (SP) 402, or statistical word tokenizer, which can include features such as a link grammar for data retrieval and parsing; a Syntax To Semantics (STS) semantic rule set 404, which can include features and rules for algebra-based transformations; and an Associative Database (ADB) 406 of linearized tuple conceptual graphs (TCG), which can utilize a conceptual graph formalism. Data 408, such as web page or other content, can be represented within the ADB, enabling both fast data retrieval in the form of semantic objects and a broad ranging taxonomy of content 414, e.g. advertising categories 416, or other content categories 418. Each semantic object contains all the related terms and phrases articulating a specific subject 420, enabling automatic categorization of any set of content, such as a given Web page.

In accordance with an embodiment, the system can be used to semantically interpret an original data 440, such as an original Web page content or an advertisement, and to populate the associate database. When a request for new data is received 444, the system uses the information provided within the semantic content system to prepare a response to the request 446, which can include semantically related content, such as related web pages, content, or advertising. The response content, which is semantically related to the original request (and which can including content such as advertising or other categories of content) can be provided as a response to the request 452.

This semantic approach can be used in a variety of ways, for example to improve the ability to serve ads based on the meaning of a website's page content. By semantically analyzing the web pages, the system can properly understand and classify the meaning and sentiment of any given digital text, and accordingly ensure that the web page receives the most appropriate advertising. The system can also ensure that campaigns are placed on pages which are contextually relevant to them, whatever the format and medium. For example, the semantic approach can be used to analyze an advertiser's ad and the website it links to, in order to identify the most relevant matches.

Figure 23:
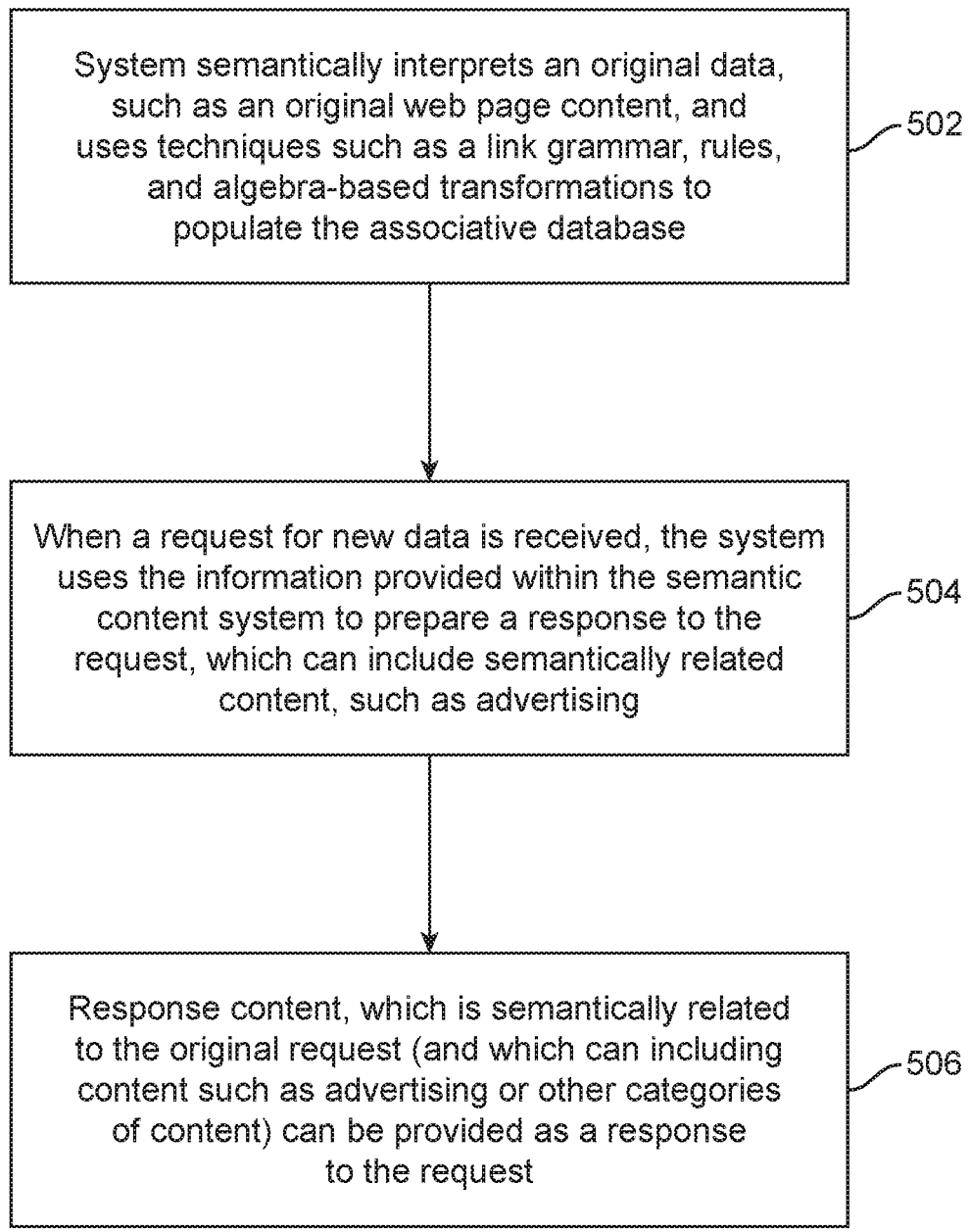
FIG. 23 shows a flowchart of a method for use of semantic understanding in searching and providing of content, in accordance with an embodiment.

FIG. 23 shows a flowchart of a method for use of semantic understanding in searching and providing of content, in accordance with an embodiment. As shown in FIG. 18, in step 502, the system semantically interpret an original data, such as an original Web page, advertisement or other content, and uses techniques such as a link grammar, rules, and algebra-based transformations to populate the associate database. In step 504, when a request for new data is received, the system uses the information provided within the semantic content system to prepare a response to the request, which can include semantically related content, such as advertising. In step 506, the response content, which is semantically related to the original request (and which can include content such as advertising or other categories of content) can then be provided as a response to the request.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed:

1. A computer-based method for finding text semantically related to a selected text by comparing one or more tuple conceptual graphs (TCG) for the selected text with one or more tuple conceptual graphs (TCGs) for a plurality of candidate similar texts, comprising the steps of:
   receiving:
      for the selected text, a first tuple conceptual graph (TCG) comprising one or more of a first name or other TCG identifier and a first set of linearized tuples, and
      for a plurality of candidate semantically related texts, at least one other TCG comprising one or more of a name or other TCG identifier and at least one other set of linearized tuples,
   wherein each of the first TCG and at least one other TCG comprise stored semantic relationships;
   ordering the first and at least one other set of linearized tuples according to a sort criteria, and folding tuple relationships into a minimal canonical representation by successively examining and merging sorted tuple relationships and resolving arguments upon ties;
   comparing the first TCG and at least one other TCG to determine a match, and if a match is found then identifying the first TCG as an equal or partial match of at least one other TCG; and
   reporting one or more of the full or the most complete partial matches as similar text.

2. The computer-based method of claim 1 wherein the selected text and the suspected similar texts are web pages.

3. The computer-based method of claim 1 wherein the selected text and the suspected similar texts are textual articles in digital form.

4. The computer-based method of claim 1 wherein the selected text is a web page and the candidate similar texts is a web based advertising media.

5. The computer-based method of claim 1 wherein the at least one other TCG is received from a database having a semantic rendering for the suspected similar text.

6. The computer-based method of claim 1 wherein the method enables a user to specify that at least one candidate similar text be from a source newer than the input text.

* * * * *